US012077412B2

(12) United States Patent
Raghunathan

(10) Patent No.: US 12,077,412 B2
(45) Date of Patent: Sep. 3, 2024

(54) SYSTEMS AND METHODS FOR GROUP ELEVATOR SCHEDULING BASED ON QUADRATIC SEMI-ASSIGNMENT PROGRAMS

(71) Applicant: Mitsubishi Electric Research Laboratories, Inc., Cambridge, MA (US)

(72) Inventor: Arvind Raghunathan, Medford, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 1452 days.

(21) Appl. No.: 16/507,084

(22) Filed: Jul. 10, 2019

(65) Prior Publication Data
US 2020/0377331 A1 Dec. 3, 2020

Related U.S. Application Data

(60) Provisional application No. 62/855,230, filed on May 31, 2019.

(51) Int. Cl.
*G06N 5/01* (2023.01)
*B66B 1/24* (2006.01)
*B66B 1/46* (2006.01)

(52) U.S. Cl.
CPC ............ *B66B 1/468* (2013.01); *B66B 1/2458* (2013.01); *G06N 5/01* (2023.01); *B66B 2201/211* (2013.01)

(58) Field of Classification Search
CPC ........ B66B 1/2408–2466; B66B 1/468; B66B 2201/20–211; B66B 2201/214; B66B 2201/4607
See application file for complete search history.

(56) References Cited

U.S. PATENT DOCUMENTS

| 7,484,597 | B2* | 2/2009 | Nikovski | ................. | B66B 1/18 |
| | | | | | 187/382 |
| 7,546,905 | B2* | 6/2009 | Nikovski | ................. | B66B 1/18 |
| | | | | | 187/247 |
| 8,794,388 | B2 | 8/2014 | Takeda | | |
| 8,839,913 | B2 | 9/2014 | Atalla et al. | | |
| 10,118,796 | B2* | 11/2018 | Nikovski | ............. | B66B 1/2458 |
| 2003/0221915 | A1* | 12/2003 | Brand | .................. | B66B 1/2458 |
| | | | | | 187/382 |
| 2018/0103116 | A1* | 4/2018 | Raghunathan | .......... | H04L 67/10 |
| 2019/0114595 | A1* | 4/2019 | Raghunathan | ..... | G01C 21/3423 |

* cited by examiner

*Primary Examiner* — Christopher Uhlir
(74) *Attorney, Agent, or Firm* — Gene Vinokur; Hironori Tsukamoto

(57) ABSTRACT

System and methods for controlling a movement of elevator cars of an elevator system. Determine, for each elevator car, an individual waiting time of accommodating each hall call. Determine, for each pair of hall calls assigned to each elevator car, a pairwise delay over the individual waiting time of each hall call in the pair caused by a joint assignment of the elevator car to accommodate the pair of the hall calls. Approximate a cumulative waiting time of an assignment of the elevator cars. Determine the assignment of the elevator cars using a branch and bound algorithm using spectral relaxations based on a generalized eigenvalue and spectral branching that assigns the plurality of hall calls to the elevator cars to minimize the approximated cumulative waiting time. Use a controller for controlling the movement of the elevator cars according to the assignment.

20 Claims, 12 Drawing Sheets

*(From 250 (NO) of FIG. 2D)*

↓

Choose a branching index $i \in I \setminus (I_l(v) \cup I_u(v))$ —255

↓

Create two nodes $v_0 = (LB(v), I_l(v) \cup \{i\}, I_u(v))$ and $v_1 = (LB(v), I_l(v), I_u(v) \cup \{i\})$ —260

↓

Set $\Gamma = \Gamma \setminus \{v\} \cup \{v_0, v_1\}$, Set $LB = lb(Top(\Gamma))$ —265

↓

If $UB - LB < \epsilon$ —270

NO → *(To 215 of FIG. 2C)*

YES → *(To 299 (STOP) of FIG. 2C)*

FIG. 2D

SYSTEMS AND METHODS FOR GROUP ELEVATOR SCHEDULING BASED ON QUADRATIC SEMI-ASSIGNMENT PROGRAMS

FIELD

The present disclosure relates to methods and systems for scheduling a bank of cars, and a set of hall calls of an elevator system in Western countries, and more particularly to determine which car should serve each incoming passenger, in order to optimize a performance metric, including an average waiting time (AWT) of all passengers.

BACKGROUND

Conventional group elevator scheduling is a combinatorial optimization problem that needs be solved for any bank with two or more elevators. The most common instance of this problem deals with assigning elevator cars to passengers as they arrive at the bank of elevators, and request service by means of one of two buttons (up or down). The scheduler then must assign a car to each hall call in a way that optimizes overall system performance, typically measured by the average waiting time (AWT) of all passengers in the system, defined as the time period from the moment a passenger arrives at the elevator landing and requests service until the moment this passenger boards some car, averaged over many arrivals.

Due to the high economic and social impact of transportation efficiency in buildings, many scheduling algorithms have been proposed to reduce the AWT of elevator passengers. For example, some older conventional scheduling algorithms used in a large number of deployed elevator installations is the nearest car algorithm, where each passenger is assigned to the nearest car that is approaching that passenger. This method is computationally very easy, and has computational complexity of only O(CN). However, because every passenger is assigned to a car without any consideration for the other passengers assigned to the same car, it completely ignores the delays that picking some passengers would cause to the pick-up time and wait of other passengers. As a result, its AWT that is very far from optimal. Moreover, it often results in bunching, where the elevator cars are distributed very unevenly around the building, and are poorly positioned to respond to new calls.

Another class of scheduling methods operate in the so-called immediate assignment mode, where a new passenger is assigned to a car immediately after service is requested by the passenger, and this assignment is never reconsidered. This method has a computational complexity, CN, and its AWT can be better over that of the nearest car algorithm, because previous assignments of passengers to cars are taken into consideration when computing the expected waiting time of the new passenger. However, the need to commit as early as possible to a particular assignment of passengers to cars (at the time of the initial call for service) deprives the scheduler from the possibility of revising the assignments if the situation changes before the assigned car reaches the passenger. That the situation will change is almost certain, and there are multiple reasons for that. The main reason is the arrival of future new passengers, whose arrival was not known at the time when the original assignment was made.

As noted, optimally solving the scheduling problem in reassignment mode has exponential complexity, and exhaustive enumeration of all possible solutions is not feasible. A general-purpose method for eliminating many of the possible solutions in combinatorial optimization problems is the branch-and-bound method. Nikovski et al., U.S. Pat. No. 7,484,597, System and Method for Scheduling Elevator Cars Using Branch-and-Bound, describe how this method can be applied to the group elevator scheduling problem in re-assignment mode. Although this method can be much faster than full exhaustive enumeration, its worst-case complexity is still exponential in the number of cars and calls.

Though achieving optimal solutions can take exponential time it is still desirable to achieve optimal solutions as they can reduce the waiting times of the passengers substantially and that outperforms known sub-optimal solutions such as the nearest-car and immediate assignment algorithms.

SUMMARY

The present disclosure relates to methods and systems for scheduling a bank of cars, and a set of hall calls of an elevator system in Western countries, and more particularly to determine which car should serve each incoming passenger, in order to optimize a performance metric, including an average waiting time (AWT) of all passengers. Wherein the scheduling modes practiced in Western countries include aspects such as passengers are continuously reassigned to cars until an actual time of the passenger pick up.

However, in formulating the methods and systems of the present disclosure, and through extensive experimentation many realizations were discovered. For example, an aspect experimented with is the need to commit as early as possible to a particular assignment of passengers to cars (at the time of the initial call for service), which if the scheduler committed to an assignment to early, resulted in depriving the scheduler from the possibility of revising the assignments if the situation changes before the assigned car reaches the passenger. Which, the aspect of the situation changing, was almost certain, and there are multiple reasons for that, including when such new passenger arrivals occur. In most scheduling applications, it was often advantageous to reconsider the initial assignments, and sometimes change the entire schedule of the elevator bank. Another reason why the situation might change is that the execution of the current schedule often does not proceed as planned, for example when passengers hold the doors longer than usual, or an entire group of passengers has initiated the service call and needs a lot more time to enter or exit the car. Constantly reconsidering all the assignments of all outstanding service calls to the available cars usually results in much shorter AWT than when immediate assignment is used, and operating in this mode, called reassignment mode, is the preferred practice in most Western countries.

During experimentation, passenger dissatisfaction was assumed to grow supra-linearly as a function of an average weight time (AWT). When minimizing objective functions, one penalizes long waits much stronger than short waits, which helped reduce extensive long waits. Discovered from experimentation is that there are several significant obstacles to achieving the shortest possible AWT in a given building. At least one obstacle was the high combinatorial complexity of the scheduling problem. For example, in a building that has an elevator bank with C cars, if N passengers must be assigned to these cars, there are $C^N$ possible assignments, each of which resulting in a different AWT value for passengers. Even for moderate passenger and car numbers, finding the optimal assignment by means of exhaustive enumeration of all assignments is computationally very difficult, with exponential complexity $O(C^N)$. Such a solution is not feasible, given the fast reaction times required by the elevator control system.

One experimental approach included using a mixed integer programming (MIP) for reassignment. Wherein solving for group elevator scheduling, the MIP solution appeared closely resemble a brand-and-bound algorithm in its use of a branch-and-cut technique, where large parts of the solution place were eliminated based on linear relaxations of an original discrete optimization problem. Discovered is that in many cases, this method quickly found a truly optimal solution to a combinatorial optimization problem, but in general, suffered from the same shortcoming as the branch-and-bound algorithm, due to its complexity which can be exponential in the worst case.

Another experimental approach for group elevator scheduling included using a greedy optimization algorithm of complexity $O(CN^2)$, which is, linear in the number of cars C and quadratic in the number of passengers $N$. Learned is that the success of this greedy optimization algorithm depends critically on the property of submodularity of the objective function. In the current context of optimizing AWT, this property is approximately appeared equivalent to the property that when a group of passengers are picked up by the same elevator car, their cumulative waiting time is larger than the sum of their individual waiting times, if they had been picked up by multiple separate cars starting from the same location, one car per passenger. This property, unfortunately, is not strictly always true for waiting times of passengers in elevator banks, due to the intricate interplay between their positions in the pickup schedule of the car.

Based upon experimentation, the methods and systems of the present disclosure resulted in developing an elevator scheduling problem that is an instance of the Semi-Assignment Problem (SAP) and can be written as $$\min_{x \in \{0,1\}^{NC}} g(x) \quad \text{(SAP)}$$
$$\text{s.t.} \quad \sum_{c=1}^{C} x_i^c = 1 \ i = 1, \ldots, N$$

where N is the number of hall calls, $x_i^c$ is a binary variable taking a value of 1 if hall call i is assigned to elevator car c, and $x=(x^1, \ldots, x^C)$ is a concatenation of the $x^c=(x_1^c, \ldots, x_N^c)$.

The function $g(x)$ is the oracle function that returns the AWT given a feasible assignment of hall calls to elevators. The function $g(x)$ is not analytically available and the AWT has to be obtained by means of a simulation. This is clearly prohibitive.

In order to obtain a tractable and reasonable approximation of the elevator scheduling problem, the first step in the method is to construct an approximation of the cumulative AWT of a group of passengers. To this end, the method uses a sum of pairwise delays (SPD). This converts the optimization problem from a general SAP to a Quadratic Semi-Assignment Problem (QSAP)

$$\min_{x \in \{0,1\}^{NC}} \sum_{c=1}^{C} \left( \sum_{i=1}^{N} w_i^c x_i^c + \sum_{i=1}^{N} \sum_{j=i+1}^{N} w_{ij}^c x_i^c x_j^c \right) \quad \text{(QSAP)}$$
$$\text{s.t.} \quad \sum_{c=1}^{C} x_i^c = 1 \ i = 1, \ldots, N$$

where $w_i^c$ is the waiting time for hall call i when that is the only call assigned to elevator car c and $w_{ij}^c$ is the additional waiting time incurred over the $(w_i^c + w_j^c)$ when the hall calls i,j are the only calls assigned to elevator car c. Moreover, the objective function of the QSAP is super modular, which allows the application of fast greedy optimization methods to obtain a feasible solution following Nikovski et al., Method for group elevator scheduling based on submodular optimization.

The second step of the algorithm is to optimize the QSAP using a branch and bound algorithm that uses spectral relaxations based on the generalized eigenvalue and spectral branching that is used to identify the branching variable. The key realization of the present disclosure is the discovery of the novel relaxation and branching that allows to outperform even commercial branch and bound algorithms for the solution of QSAPs.

According to an embodiment of the present disclosure, a system for controlling a movement of a plurality of elevator cars of an elevator system. The system including at least one input interface for accepting a plurality of hall calls requesting service of the plurality of elevator cars to different floors of a building. A processor in communication with the input interface is configured to determine, for each elevator car, an individual waiting time of accommodating each hall call, if the hall call is the only hall call assigned to the elevator car. Determine, for each pair of hall calls assigned to each elevator car, a pairwise delay over the individual waiting time of each hall call in the pair caused by a joint assignment of the elevator car to accommodate the pair of the hall calls. Approximate a cumulative waiting time of an assignment of the plurality of elevator cars to accommodate the plurality of hall calls as a sum of individual waiting times for accommodating each hall call with the assigned elevator car, and a sum of all pairwise delays determined between all pairs of hall calls assigned to the same elevator car. Determine the assignment of the plurality of elevator cars using a branch and bound algorithm using spectral relaxations based on a generalized eigenvalue and spectral branching that assigns the plurality of hall calls to the plurality of elevator cars to minimize the approximated cumulative waiting time. A controller for controlling the movement of the plurality of elevator cars according to the assignment.

According to another embodiment of the present disclosure, a method for scheduling elevator cars of an elevator system. The method including using at least one input interface for accepting a plurality of hall calls requesting the plurality of elevator cars to different floors of a building. Determining independently, using a processor in communication with the input interface, for each elevator car, an independent waiting time of accommodating each hall call, if the hall call is the only hall call assigned to the elevator car. Determining, for each pair of hall calls assigned for each elevator car, a pairwise delay over the individual waiting time of each hall call in the pair caused by a joint assignment of the elevator car to accommodate the pair of the hall calls. Approximating a cumulative waiting time of an assignment of the plurality of elevator cars to accommodate the plurality of hall calls as a sum of individual waiting times for accommodating each hall call with the assigned elevator car and a sum of all pairwise delays determined for the assigned elevator car between all pairs of hall calls assigned to the same elevator car. Determining the assignment of the plurality of elevator cars using a branch and bound algorithm using spectral relaxations based on a generalized eigenvalue and spectral branching that assigns the plurality of hall calls to the plurality of elevator cars to minimize the approximated cumulative waiting time. Using a controller for controlling the movement of the plurality of elevator cars according to the assignment.

Another embodiment of the present disclosure a non-transitory computer readable storage medium embodied thereon a program executable by a computer for performing a method. The method for scheduling elevator cars of an elevator system, the elevator system including a plurality of elevator cars, and a plurality of hall calls. The method includes using at least one input interface for accepting a plurality of hall calls requesting the plurality of elevator cars to different floors of a building. Determining independently, using a process in communication with the input interface, for each elevator car, an independent waiting time of accommodating each hall call, if the hall call is the only hall call assigned to the elevator car. Determining, for each pair of hall calls assigned for each elevator car, a pairwise delay over the individual waiting time of each hall call in the pair caused by a joint assignment of the elevator car to accommodate the pair of the hall calls. Approximating a cumulative waiting time of an assignment of the plurality of elevator cars to accommodate the plurality of hall calls as a sum of individual waiting times for accommodating each hall call with the assigned elevator car and a sum of all pairwise delays determined for the assigned elevator car between all pairs of hall calls assigned to the same elevator car. Determining the assignment of the plurality of elevator cars using a branch and bound algorithm using spectral relaxations based on a generalized eigenvalue and spectral branching that assigns the plurality of hall calls to the plurality of elevator cars to minimize the approximated cumulative waiting time. Using a controller for controlling the movement of the plurality of elevator cars according to the assignment.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 2C and FIG. 2D illustrate a flowchart of some steps in an improved Branch and Bound Algorithm, in particular, step 5 of FIG. 2A that is changed to now solve (MIQP–GSpV($I_l$, $I_u$)), thus replacing (MIQP–GSp($I_l$, $I_u$)) of step 5 of FIG. 2A, according to some embodiments of the present disclosure;

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The present disclosure relates to methods and systems for scheduling a bank of cars, and a set of hall calls of an elevator system in Western countries, and more particularly to determine which car should serve each incoming passenger, in order to optimize a performance metric, including an average waiting time (AWT) of all passengers. Wherein the scheduling modes practiced in Western countries include aspects such as passengers are continuously reassigned to cars until an actual time of the passenger pick up.

Figure 1A:
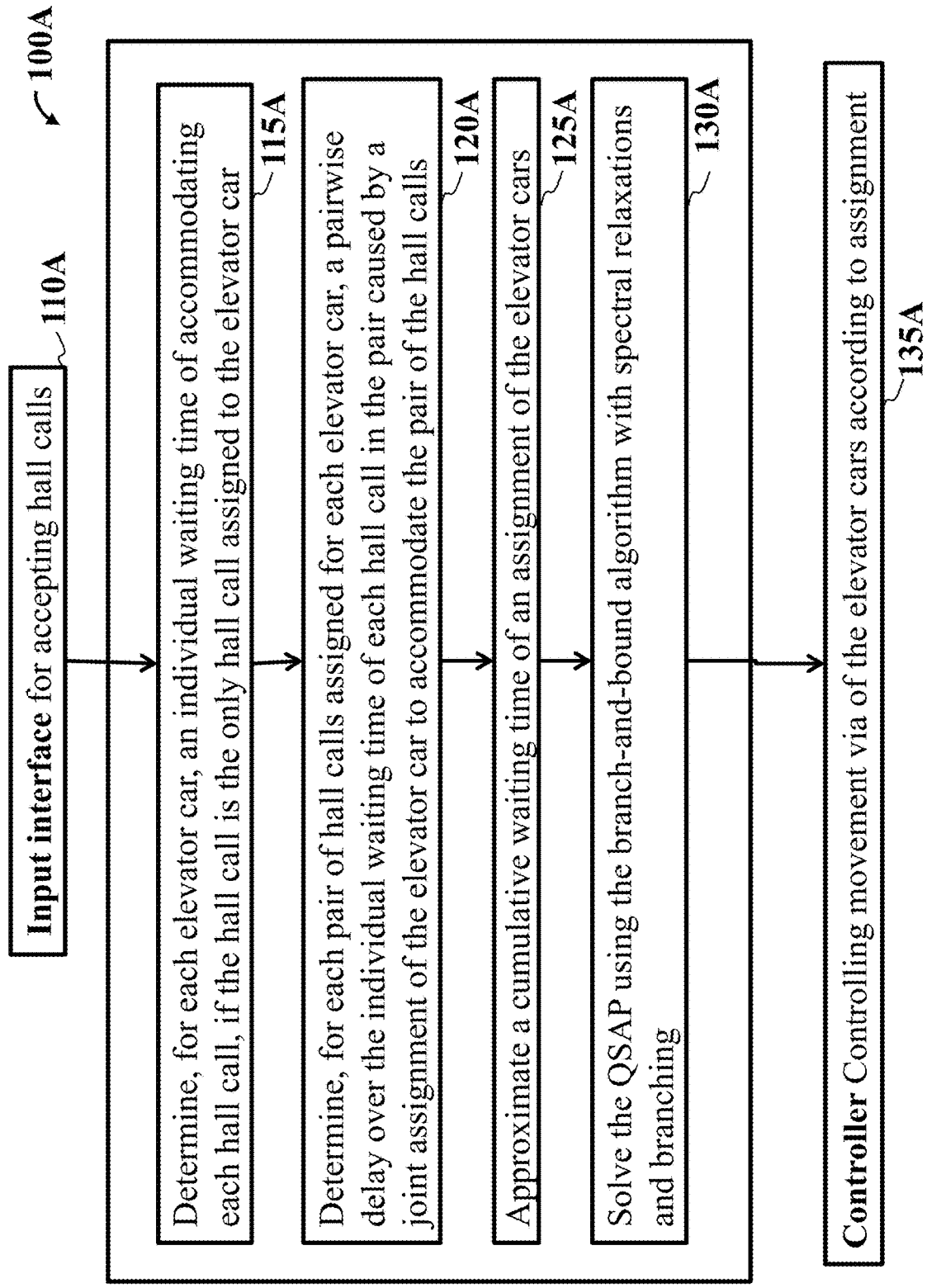
FIG. 1A is a block diagram illustrating a method for controlling a movement of a plurality of elevator cars of an elevator system, according to an embodiment of the present disclosure.

FIG. 1A is a block diagram of a method for controlling a movement of a plurality of elevator cars of an elevator system, according to an embodiment of the present disclosure.

Step 110A of FIG. 1A of method 100A includes using at least one input interface for accepting a plurality of hall calls requesting the plurality of elevator cars to different floors of a building. Such an interface can be located at every elevator landing in the building. For example, the user interface can include an up button and a down button, which can be used by a passenger to request transportation in a respective direction. Another type of user interface can be a destination panel, which includes buttons for all possible destination floors.

Contemplated is that the plurality of hall calls may be accepted individually and simultaneously, by a device(s) of the methods and systems of the present disclosure. A combination between the two types of interfaces is also possible, for example a full destination panel may be located at a lobby of a building (or two more locations), and a simpler two-button interface can be located at other floors.

Step 115A of FIG. 1A includes determining independently, using a processor in communication with the input interface, for each elevator car, an independent waiting time of accommodating each hall call, if the hall call is the only hall call assigned to the elevator car. In practice, an internal simulator that simulates the path of the car, if it has to pick up this passenger only can do this determining. Note, that any outstanding car calls placed by passengers already in the car must be included in the simulation. For example, if the car is at the third floor, and the hall call is at the eighth floor, but there is an outstanding passenger car call to the fifth floor, the stop at the fifth floor must be simulated, too.

Step 120A of FIG. 1A includes determining, for each pair of hall calls assigned for each elevator car, a pairwise delay over the individual waiting time of each hall call in the pair caused by a joint assignment of the elevator car to accommodate the pair of the hall calls. In practice, an internal simulator that simulates the path of the car if it has to pick up these two passengers only, according to the preferred pick-up order for this elevator bank can do this determining. The method of deciding the pick-up order can be the group collective policy, where the car picks up all passengers in front of it in its current direction of motion, going in the same direction, then reverses direction to pick up all passengers going in the opposite direction, and finally reverses direction again to pick up passengers going in its original direction, but behind its starting floor. Other pick-up sequencing policies are also possible, and can be simulated similarly. After the simulation is complete, the increase in waiting times of the two passengers are computed with respect to their individual waiting times determined in step 115A. The sum of these increases is the pairwise delay between the two hall calls. Note, that in all cases, only one of these increases is greater than zero, and the other one is always zero.

Step 125A of FIG. 1A includes approximating a cumulative waiting time of an assignment of the plurality of elevator cars to accommodate the plurality of hall calls as a sum of individual waiting times c wi for accommodating each hall call i with its assigned elevator car c, and a sum of all pairwise delays c wij between all pairs of hall calls (i,j) assigned to the same elevator car c, according to the formula in Eq (1) (see below).

Step 130A of FIG. 1A includes determining the assignment of the plurality of elevator cars, using a QSAP using the branch-and-bound algorithm with spectral relaxations and branching, to minimize the approximated cumulative waiting time.

Step 135A of FIG. 1A includes using a controller for controlling the movement of the plurality of elevator cars according to the assignment. Once the schedule has been determined, each car starts serving the hall calls assigned to it, according to the accepted sequence discussed above.

Figure 1B:
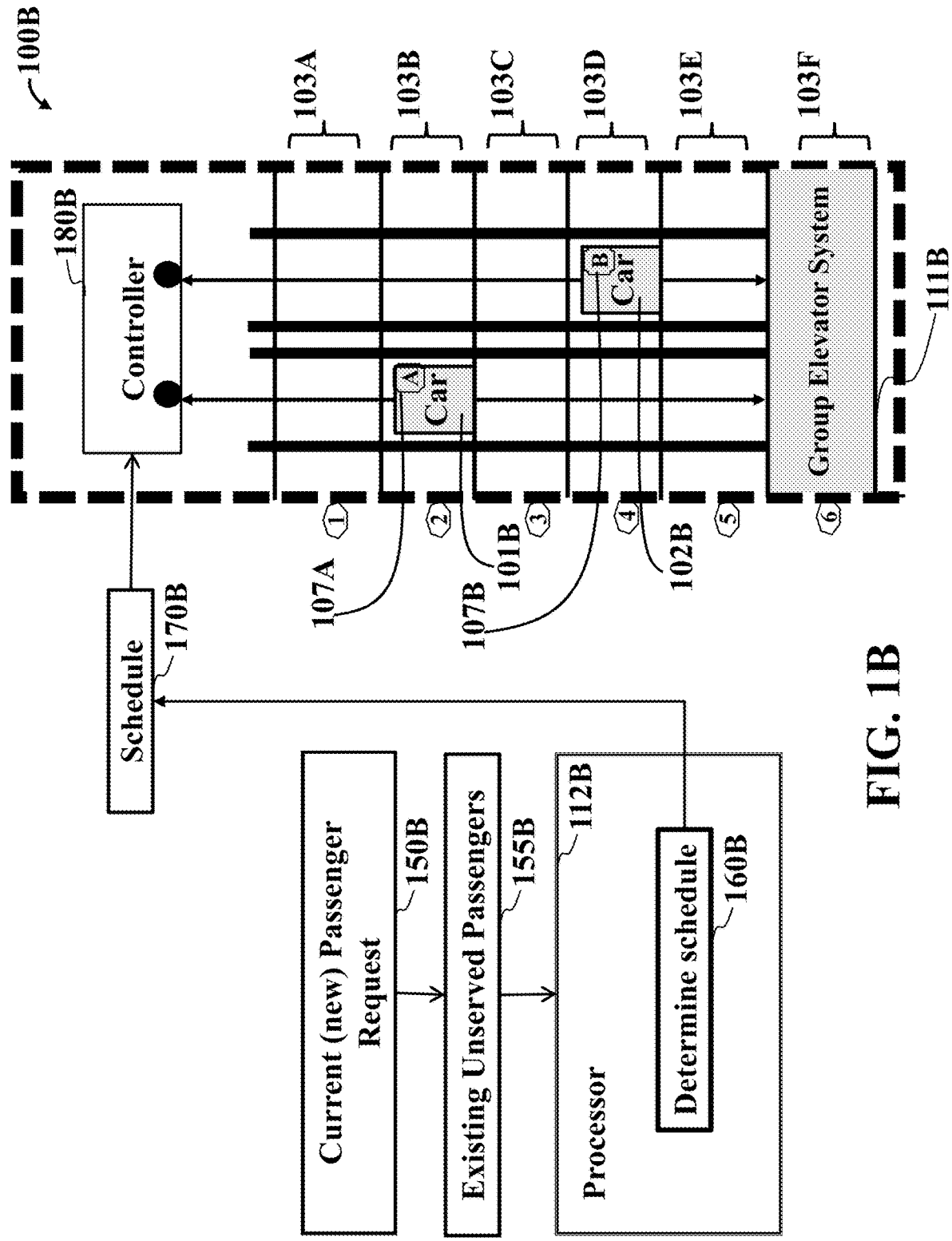
FIG. 1B is a schematic illustrating the method of FIG. 1A, for scheduling hall calls from passengers regarding controlling movement of the plurality of elevator cars of an elevator system, according to some embodiments of the present disclosure.

FIG. 1B is a schematic illustrating some components of the method of FIG. 1A, for scheduling elevator cars 101B-102B in a group elevator system 111B in a building (not shown) having multiple floors 103A-103F, according to embodiments of the present disclosure. All passenger requests for service, are initiated by each passenger that activates an input interface 1-6 located on the floor the passenger is currently located. The passenger can activate the input interface 1-6 located at the landing of each floor by pressing either an up direction to go to higher in height floor or for a down direction to a lower in height floor of the building, on the current floor the passenger is located. Further, passengers from a button panel 107A activate car calls A, B, 107B located in each car 101, 102, and are logged in the form of a table of existing unserved passengers 155B. Note that the car calls could be logged on a different table, then the table of existing unserved passengers 155B. The passenger requests or hall calls are also logged in the form of a table in the existing unserved passengers 155B hall call list. Wherein there are two types of passenger requests or hall calls, which are current passenger requests 150B and existing unserved passenger requests 155B.

The table of passenger requests of the existing unserved passenger requests 155 can be continually changing depending upon if an elevator car 101B, 102B, serves a passenger request, i.e. hall call, and car call. For example, when a hall call or a car call is served by an elevator car or car 101B, 102B, i.e. the passenger is picked up by the elevator (hall call related) or the elevator stops at the requested floor (car call related), that existing hall call or car call previously logged in the table 155B is then removed from the table 155B. Further, when a new or current hall call 150B or car call A, B, is initiated, the new hall call 150B or new car call A, B, is added to the table 155B. At regular intervals, or at specific events, such as new hall calls 150B & new car calls A, B, or starts/stops of cars 101B, 102B, at floors 103A-103F, the scheduler 160B is executed via a processor 112B. Wherein a schedule 170B is produced in the form of a full assignment of all outstanding hall calls to cars 101B, 102B. The controller 180B continuously executes the current schedule 170B, according to the preferred service policy, for example the group collective service policy, also known as the selective collective principle, or some other policy.

Figure 1C:
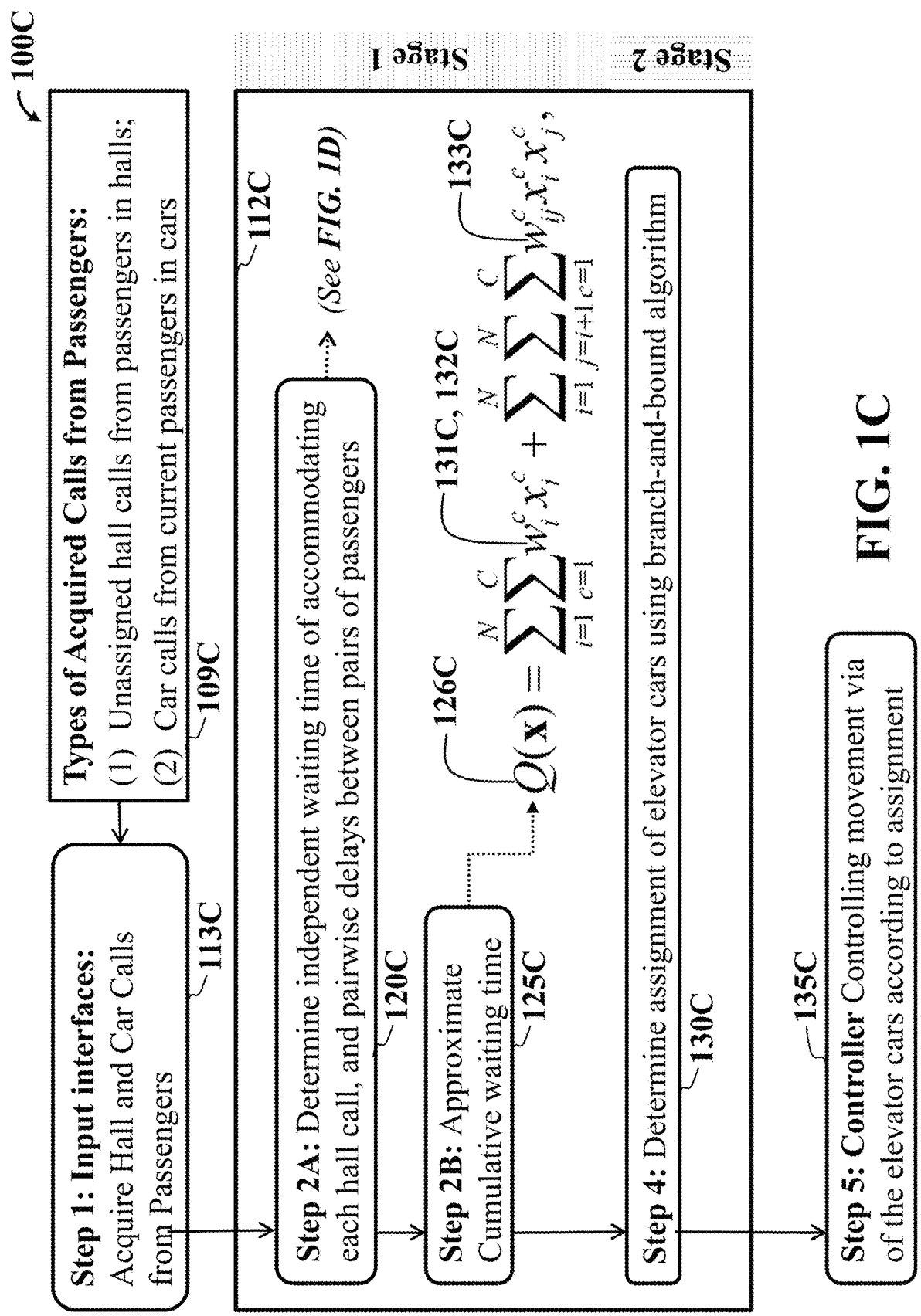
FIG. 1C is a flow diagram of the method of FIG. 1A, for controlling a movement of a plurality of elevator cars of an elevator system, according to some embodiments of the present disclosure.

FIG. 1C is a flow diagram of the method of FIG. 1A, for controlling a movement of a plurality of elevator cars of an elevator system using an algorithm having two stages, the first stage includes steps 1, 2A & 2B, and the second stage, the novelty of the present disclosure includes step 3, wherein step 4 is the implementation of the results of step 3, according to embodiments of the present disclosure.

As noted above, the algorithm has two main stages: the first stage is a computation of the approximation of average wait time (AWT) based on a sum of pairwise delays (SPD), and the second stage is the optimization using a Branch and Bound algorithm based on Spectral Relaxation and Branching. second stage, the novelty of the present disclosure includes step 3.

Steps 1, 2A & 2B of FIG. 1C—First Stage of Algorithm

Step 1, of FIG. 1C for method 100C, 113C illustrates the collecting/acquiring information about the types of acquired calls from passengers, i.e. unassigned hall calls from passengers pushing up/down buttons of input interfaces in halls at each floor of the building, and car calls from passengers in the elevator car pushing a button on a button panel that corresponds to a specific floor of the building.

Step 2A of FIG. 1C, 120C, determines the independent waiting time of accommodating each hall call, and pairwise delays between pairs of passengers (see FIG. 1D), that in step 2B, 125C constructs an approximate cumulative waiting time 126C in the form of a quadratic Boolean function.

Below is a detailed explanation of Stage 1 regarding the Quadratic Boolean Approximation.

Stage 1: Quadratic Boolean Approximation

During the first stage, i.e. comprising steps of, step 1 (113C), Step 2A (120C) and Step 2B (125C), includes two sets of coefficients $w_i^c$ 131C and $w_{ij}^c$, 133C that are computed to construct a quadratic Boolean approximation of the cumulative waiting time of the entire set of passengers currently waiting for service at the time when reassignment is performed, in the form:

$$Q = \sum_{c=1}^{C} \left( \sum_{i=1}^{N} w_i^c x_i^c + \sum_{i=1}^{N} \sum_{j=i+1}^{N} w_{ij}^c x_i^c x_j^c \right) \quad (1)$$

where $x_i^c \in \{0,1\}$ is an indicator variable which takes on a value of 1 when passenger i is assigned to car c, and 0 otherwise. All N·C indicator variables can be collected in a decision vector and $x = (x^1, \ldots, x^C)$ is a concatenation of the variables $x^c = (x_1^c, \ldots, x_N^c)$. This procedure of scheduling elevator cars using pairwise delay minimization is explained in U.S. Pat. No. 7,546,905, i.e. same assignee as the present disclosure, is incorporated herein and thereafter in its entirety. The pairwise delay minimization procedure is repeated below, but illustrated using a slightly different notation.

Let H be the set of N passengers $\{h_1, \ldots, h_N\}$ still waiting. A single passenger $h_i$ is described by the tuple $(t_i, o_i, d_i)$, where $t_i$ is the arrival time, $o_i$ is the arrival floor, and $d_i$ is the indicated direction of movement, or the desired destination floor, if known. A full assignment of the N passengers to the C cars in a bank would be a partition of H into C subsets $H_c$, such that $H=H_1 \cup \ldots \cup H_C$, and $H_i \cap H_j = \emptyset$ if $\neq j$. Let also $W_c(h|A)$, where h is a passenger and A is a set of passengers, denote the expected waiting time of passenger h if assigned to car c (as it is in its current position), and also all passengers in the set A are assigned to the same car c, too. Note that this waiting time reflects all constraints that already exist for car c, including stops requested by passengers who are already inside the car, and have indicated their destination floor by pressing one of the buttons on the destination panel inside the car. The expected waiting time $W_c(h|A)$ can be computed relatively easily by performing a forward simulation of the path of car c until the time it picks up passenger h, while also stopping to unload passengers already in it, or picking up other passengers in the set A that need to picked up before passenger h. Such a simulation supposes that a specific predetermined order of servicing hall and car calls will be followed by the schedule execution system of the elevator bank. The usual order adopted by most actual elevator systems, commonly called the group collective policy, is to service all car and hall calls in the current direction of motion of the car, then reverse its direction, and repeat the procedure in alternating directions indefinitely. However, in practice, any order can be followed, as long as it is known in advance, fixed, and can be simulated in software.

Then, the coefficients in the quadratic Boolean approximation shown in Equation (1) can be computed as follows:

$$w_i^c = W_c(h_i|\{h_i\}) \quad (2)$$

$$w_{ij}^c = W_c(h_i|\{h_i,h_j\}) - W_c(h_i|\{h_i\}) + W_c(h_j|\{h_i,h_j\}) - W_c(h_j|\{h_j\}) \quad (3)$$

Per equation (2), the linear coefficient $w_i^c$ is simply the expected waiting time of passenger $h_i$, if that passenger is picked by car c, and no other passenger is picked up by that car. In order to compute the N·C linear coefficients $w_i^c$, a total of N·C forward simulations must be performed, from the current position of each car to the floor of each passenger. These simulations are very simple and usually very fast.

Per equation (3), the bilinear coefficient $w_{ij}^c$ is equal to the mutual delay between passengers $h_i$ and $h_j$. For a specific pick-up order of passengers by car c, only one of the two passengers is causing a delay to the other. (The passenger who will be picked up first causes a delay for the passenger who will be picked up second.) In order to compute this delay, we compute the two differences $W_c(h_i|\{h_i,h_j\}) - W_c(h_i|\{h_i\})$ and $W_c(h_j|\{h_i, h_j\}) - W_c(h_j|\{h_j\})$, only one of which is zero. In practice, the two values $W_c(h_i|\{h_i,h_j\})$ and $W_c(h_i|\{h_i\})$ can be computed by means of only one forward simulation, where car c picks up both passengers $h_i$ and $h_j$, and their respective waiting times are calculated. The other two values, $W_c(h_i|\{h_i\})$ and $W_c(h_j|\{h_j\})$, have been computed during the calculation of the linear coefficients, and could be stored during that step for reuse. In total, the computation of the N(N−1)C/2 bilinear coefficients requires an equal number of forward simulations, one for every car and every pair of passengers. These simulations are also relatively simple and very fast.

Step 3 of FIG. 1C—Second Stage of Algorithm

Step 3 of FIG. 1C, 130C determines the assignment of the plurality of elevator cars using a greedy optimization algorithm by executing N assignment steps, such that at each step the marginal increase in waiting time 131 among all passengers that are not assigned yet is minimized, and executes the current schedule according to the current assignment, until the next reassignment step. In particular, step 3 is the second stage of the algorithm, and is an optimization using a Branch and Bound algorithm based on Spectral Relaxation and Branching, the novelty of the present disclosure.

As noted above, the second stage of the algorithm is to optimize the QSAP using a branch and bound algorithm that uses spectral relaxations based on the generalized eigenvalue and spectral branching that is used to identify the branching variable. At least one key realization of the present disclosure is the discovery of the novel relaxation and branching that allows to outperform even commercial branch and bound algorithms for the solution of QSAPs.

Step 4 of FIG. 1C, 135C includes using a controller for controlling the movement of the plurality of elevator cars according to the assignment.

Returning to Step 3, 130C in regard to the second stage of the algorithm, the following provides a detail explanation of the Branch and Bound Algorithm, along with analyzing several approaches that were considered to obtain a relaxation. The approaches that were analyzed and tested during experimentation included a factorable programming relaxation, semidefinite programming and spectral relaxation. These approaches will be reviewed and discussed in accordance with discovering a best approach to obtain relaxation for the methods and systems of the present disclosure.

Stage 2: Branch and Bound Algorithm

For simplicity of exposition, the QSAP is reformulated as the general mixed integer quadratic programming problem (MIQP)

$$\begin{aligned} \min_x \quad & x^T Q x + q^T x \quad \text{(MIQP)} \\ \text{s.t.} \quad & Ax = b, Cx \le d \\ & l \le x \le u \\ & x_i \in \mathbb{Z}, \, i \in J \subseteq \{1, \ldots, n\} \end{aligned}$$

where $Q \in R^{n \times n}$ is a symmetric indefinite matrix, $q \in R^n$ is a vector, $A \in R^{m \times n}$, $b \in R^m$, $C \in R^{p \times n}$, $d \in R^p$, $1$, $u \in R^n$. The vectors $l$, $u$ are the lower and upper bounds on the variables respectively. $\mathbb{Z}$ denotes the set of integers and J is the set of indices of x that are restricted to be integers.

Still referring to Step 3 of FIG. 1C, 130C, the QSAP can be identified with (MIQP) by noting that n=NC, J={1, . . . , NC}, p=0, m=N, l=0, u=1. The remaining Q, q, A, b can be defined as $$q = \begin{pmatrix} w^1 \\ \vdots \\ w^C \end{pmatrix} \text{ with } w^c = \begin{pmatrix} w_1^c \\ \vdots \\ w_N^c \end{pmatrix}, b = \begin{pmatrix} 1 \\ \vdots \\ 1 \end{pmatrix}, A = \begin{pmatrix} e_1^T & \cdots & e_1^T \\ \vdots & \ddots & \vdots \\ e_N^T & \cdots & e_N^T \end{pmatrix}$$

$$Q = \begin{pmatrix} W^1 & 0 & \cdots & 0 & 0 \\ 0 & W^2 & \cdots & 0 & 0 \\ \vdots & \vdots & \ddots & \vdots & \vdots \\ 0 & 0 & \cdots & W^{C-1} & 0 \\ 0 & 0 & \cdots & 0 & W^C \end{pmatrix},$$

$$W^c = \begin{pmatrix} 0 & \frac{1}{2}w^c_{12} & \cdots & \frac{1}{2}w^c_{1(N-1)} & \frac{1}{2}w^c_{12} \\ \frac{1}{2}w^c_{12} & 0 & \cdots & \frac{1}{2}w^c_{2(N-1)} & \frac{1}{2}w^c_{2N} \\ \vdots & \vdots & \ddots & \vdots & \vdots \\ \frac{1}{2}w^c_{1(N-1)} & \frac{1}{2}w^c_{2(N-1)} & \cdots & 0 & \frac{1}{2}w^c_{(N-1)N} \\ \frac{1}{2}w^c_{1N} & \frac{1}{2}w^c_{2N} & \cdots & \frac{1}{2}w^c_{(N-1)N} & 0 \end{pmatrix}$$

where $e_i \in R^N$ is the unit vector with 1 for the i-th component and 0 elsewhere.

The key to solving the (MIQP) efficiently using a branch-and-bound algorithm is to employ a relaxation that yields the best lower bound. There exist several approaches to obtaining a relaxation in the literature. These include factorable programming relaxation, semidefinite programming and spectral relaxation.

Experimental Relaxation Approach—Factorable Programming Relaxation

During this analyzing and testing of experimenting with relaxation, the factorable programming relaxation for the QSAP is $$\min_{x,y} \quad \sum_{i=1}^{N}\sum_{j=1}^{N} Q_{ij} y_{ij} + q^T x \quad \text{(MIQP-FP)}$$

s.t. $\quad Ax = b, Cx \leq d$ $l \leq x \leq u$ $y_{ij} = y_{ji}, 1 \leq i < j \leq n$ $l_j x_i + l_i x_j - l_i l_j \leq y_{ij}, 1 \leq i \leq j \leq n$ $y_{ij} \leq u_j x_i + l_i x_j - l_i u_j, 1 \leq i \leq j \leq n$ $y_{ij} \leq l_j x_i + u_i x_j - u_i l_j, 1 \leq i \leq j \leq n$ $u_j x_i + u_i x_j - u_i u_j \leq y_{ij}, 1 \leq i \leq j \leq n$ The factorable relaxation introduces additional variables $y_{ij}$, which are commonly referred to as the linearization of the quadratic term $x_i x_j$. Note that at any feasible point x to (MIQP) is also feasible to the (MIQP–FP) where $y_{ij}=x_i x_j$. It is well known in the literature that (MIQP–FP) is a relaxation to the (MIQP). While (MIQP) is a quadratic program, (MIQP–FP) is only a linear program. On the other hand (MIQP–FP) has $n^2$ additional variables. This makes it computationally more expensive to solve. This is particularly severe in the context of (QSAP) for elevator scheduling where the problems are typically solved on low-power processors such as FPGAs. Hence, the (MIQP–FP) is not suitable for the solution of (QSAP).

Experimental Relaxation Approach—Semidefinite Programming Relaxation

During this analyzing and testing of experimenting with relaxation, the factorable programming relaxation for the QSAP is $$\min_{x,Y} \quad \sum_{i=1}^{n}\sum_{j=1}^{n} Q_{ij} Y_{ij} + q^T x \quad \text{(MIQP-SDP)}$$

s.t. $\quad Ax = b, Cx \leq d$ $l \leq x \leq u$

Y is symmetric, positive semidefinite.

The semidefinite programming relaxation introduces additional variables $Y_{ij}$. These variables can be formed into matrix Y which is required to be symmetric and positive semidefinite. Note that at any feasible point x to (MIQP) is also feasible to the (MIQP–SDP) where $Y_{ij}=x_i x_j$. It is well known in the literature that (MIQP–SDP) is a relaxation to the (MIQP). While (MIQP) is a quadratic program, (MIQP–SDP) is a semidefinite program. On the other hand (MIQP–SDP) has $n^2$ additional variables. This makes it computationally more expensive to solve. This is particularly severe in the context of (QSAP) for elevator scheduling where the problems are typically solved on low-power processors such as FPGAs. Hence, the (MIQP–SDP) is not suitable for the solution of (QSAP).

Experimental Relaxation Approach—Spectral Relaxation

During this analyzing and testing of experimenting with relaxation, the spectral relaxation for the mixed integer quadratic programming problem (MIQP) is $$\min_{x} \quad x^T Q x + q^T x + \lambda_e (x^T x - (l+u)^T x + l^T u) \quad \text{(MIQP-Sp)}$$

s.t. $\quad Ax = b, Cx \leq d$ $l \leq x \leq u$ where $\alpha_e$ is a positive scalar and is chosen as $\alpha_e = \max(0, -\sigma_{min}(Q))$. The notation $\sigma_{min}(Q)$ denotes the smallest eigenvalue of the matrix Q. It is well known that the optimal objective function value of (MIQP-Sp) is a lower bound to the (MIQP). Hence, the (MIQP-Sp) is a relaxation of the (MIQP).

Still referring to Step 3 of FIG. 1C, 130C, in contrast to (MIQP–FP) and (MIQP–SDP), the (MIQP-Sp) has the same size as the original (MIQP). However, the (MIQP-Sp) does not exploit the equality constraints in the (MIQP) in the relaxation. Hence, this is a weak relaxation. Still it has been quite popular since it only requires the computation of the smallest eigenvalue.

From the survey of the above existing relaxation methods, based upon the experimentation, it is clear that there is a need to develop a strong relaxation that also includes the information on the constraints.

Generalized Spectral Relaxation

Still referring to Step 3 of FIG. 1C, 130C, in this embodiment of FIG. 1C, it is proposed to solve the QSAP using a generalized spectral relaxation of the mixed integer quadratic programming problem (MIQP). The generalized spectral relaxation of the MIQP is $$\min_{x} \quad x^T Q x + q^T x + \lambda_g (x^T x - (l+u)^T x + l^T u) \quad \text{(MIQP-GSp)}$$

s.t. $\quad Ax = b, Cx \leq d$ $l \leq x \leq u$ where $\delta$ is a scalar constant that is typically taken to be greater than or equal to 1, $\lambda_g$ is a nonnegative parameter that is given by $$\lambda_g = \max(0, -\sigma_{g,min}(Q, A, \delta)) \quad (4)$$

where $$\sigma_{g,min}(Q, A, \delta) = \min_u \frac{u^T Q u}{u^T(I + \delta A^T A)u}$$

is generalized eigenvalue. The scalar constant δ is called the multiplicative factor for the equality constraints.

The function $\sigma_{g,min}(Q, A, \delta)$ is the smallest generalized eigenvalue and is readily obtained using standard eigenvalue techniques, G. H. Golub and C. F. Van Loan, Matrix Computations (Johns Hopkins Studies in Mathematical Sciences) (3rd Edition).

At least one key realization is that as δ=∞ the $\sigma_{g,min}(Q, A, \delta)$ converges to the smallest eigenvalue on the projection of the matrix Q on to the null space of A. In other words, $$\lim_{\delta \to \infty} \sigma_{g,min}(Q, A, \delta) = \sigma_{min}(Z^T Q Z)$$

where Z is a basis for the null space of A. It is well known that $\sigma_{g,min}(Q, A, \delta) < \sigma_{min}(Z^T Q Z))$ for all finite values of δ. Hence, a tighter relaxation is obtained. In practice, the parameter δ is chosen sufficiently large and never altered.

The (MIQP–GSp) is an instance of the class of convex quadratic programs, such that this problem can be efficiently solved to obtain a global minimum. For (MIQP–GSp), the prescribed value of $\lambda_g$ in Equation (4), the objective value at any feasible point for (MIQP–GSp) is lower than the objective value of (MIQP). Hence, the solution of (MIQP–GSp) provides a valid lower bound for the (MIQP).

Unlike the (MIQP–FP) and (MIQP–SDP) relaxations the (MIQP–GSp) is a problem that has the same number of variables as the (MIQP). Further, unlike the (MIQP–Sp) the (MIQP–GSp) also includes the information on the equality constraints in the objective. Due to this inclusion of equality constraints, the constant $\lambda_g \leq \lambda_e$ and hence, the relaxation obtained by solving (MIQP–GSp) is stronger than (MIQP–Sp). Thus, the best relaxation approach decided for the methods and systems of the present disclosure is the MIQP–GSp relaxation approach.

Figure 1D:
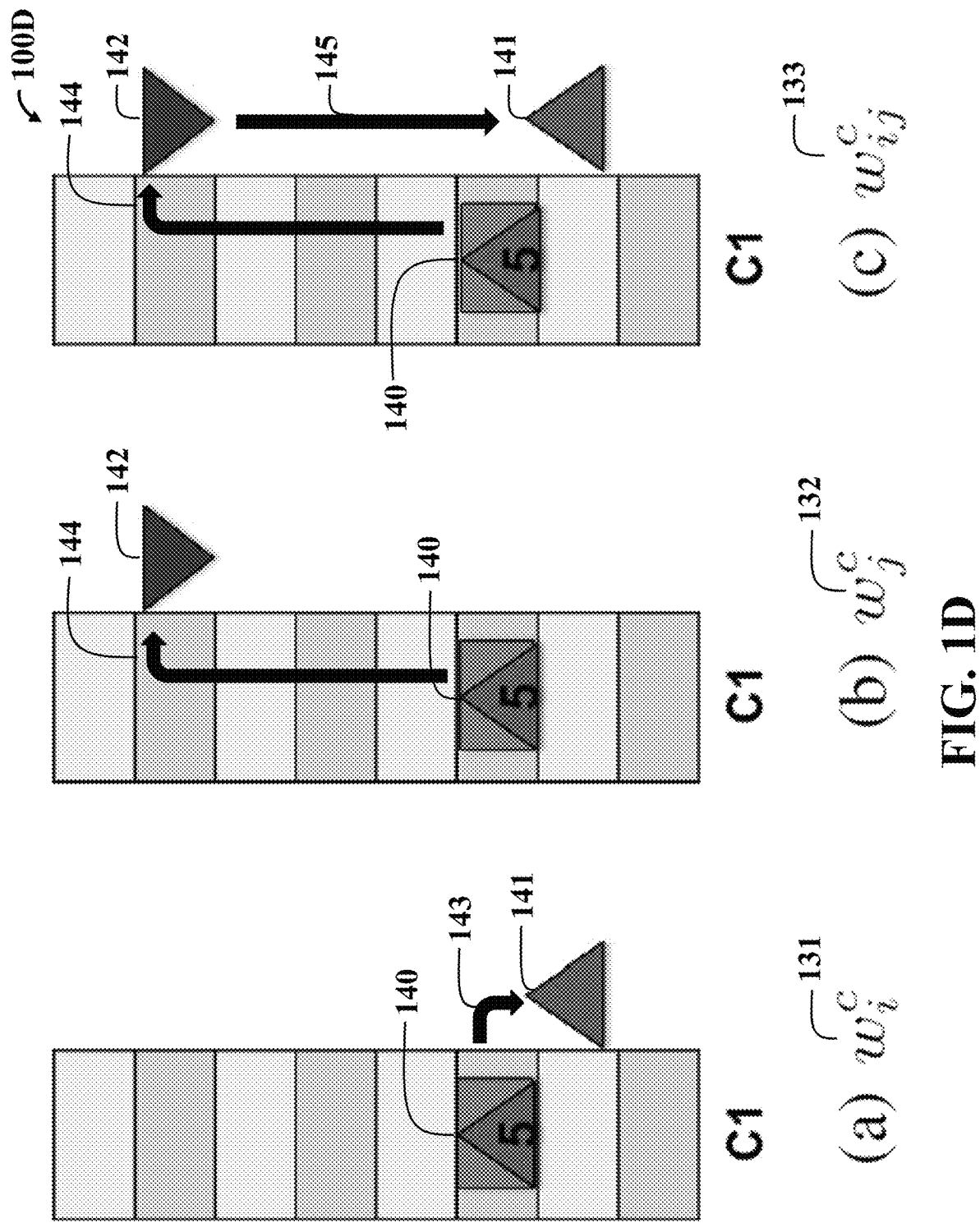
FIG. 1D is a schematic illustrating the computation of unary and pairwise terms of step 120 of FIG. 1C, according to some embodiments of the present disclosure.

FIG. 1D is a schematic illustrating the computation of unary and pairwise terms of step 120 of FIG. 1C, according to embodiments of the present disclosure. In FIG. 1D, the individual waiting times (unary terms) and mutual delays (pairwise terms) are computed for two passengers 141 and 142 to be picked up by the same car 140 (C1, currently at the 5th floor, and moving up).

In FIG. 1D-(a), the car will reverse its direction and quickly pick up 143 the first passenger from the floor below. The resulting waiting time will be the unary term 131 for the first passenger 141. This time can be computed by means of forward simulation of what the car will do when picking up that passenger.

In FIG. 1D-(b), through a similar simulation, it will be determined that the car will continue its direction of motion and pick up 144 the second passenger 142. The resulting waiting time of that passenger 142 will be his unary term 131.

Finally, in FIG. 1D-(c), it is determined that if the car 140 is to pick up both passengers 141 and 142, following the principle of group collective control, it will first pick up 144 the second passenger 142, as in FIG. 1D-(b), and only then will it reverse direction to come down 145 and pick up the first passenger 141. As a result, the first passenger 141 will wait much longer for service than if he was picked up alone, as in FIG. 1D-(a). This difference in the waiting time of passenger 141 between cases 1D-(c) and 1D-(a) is the delay the second passenger 142 would cause to passenger 141, and is equal to the pairwise delay term 133 between these two passengers. Note that for each pair of passengers, only one of them is delaying the other, but not vice versa; in FIG. 1D, passenger 142 is delaying passenger 141, but passenger 142 is not delayed by passenger 141, specifically for this car 140 in its current direction of motion. For a different car, the delay might be different.

Figure 2A:
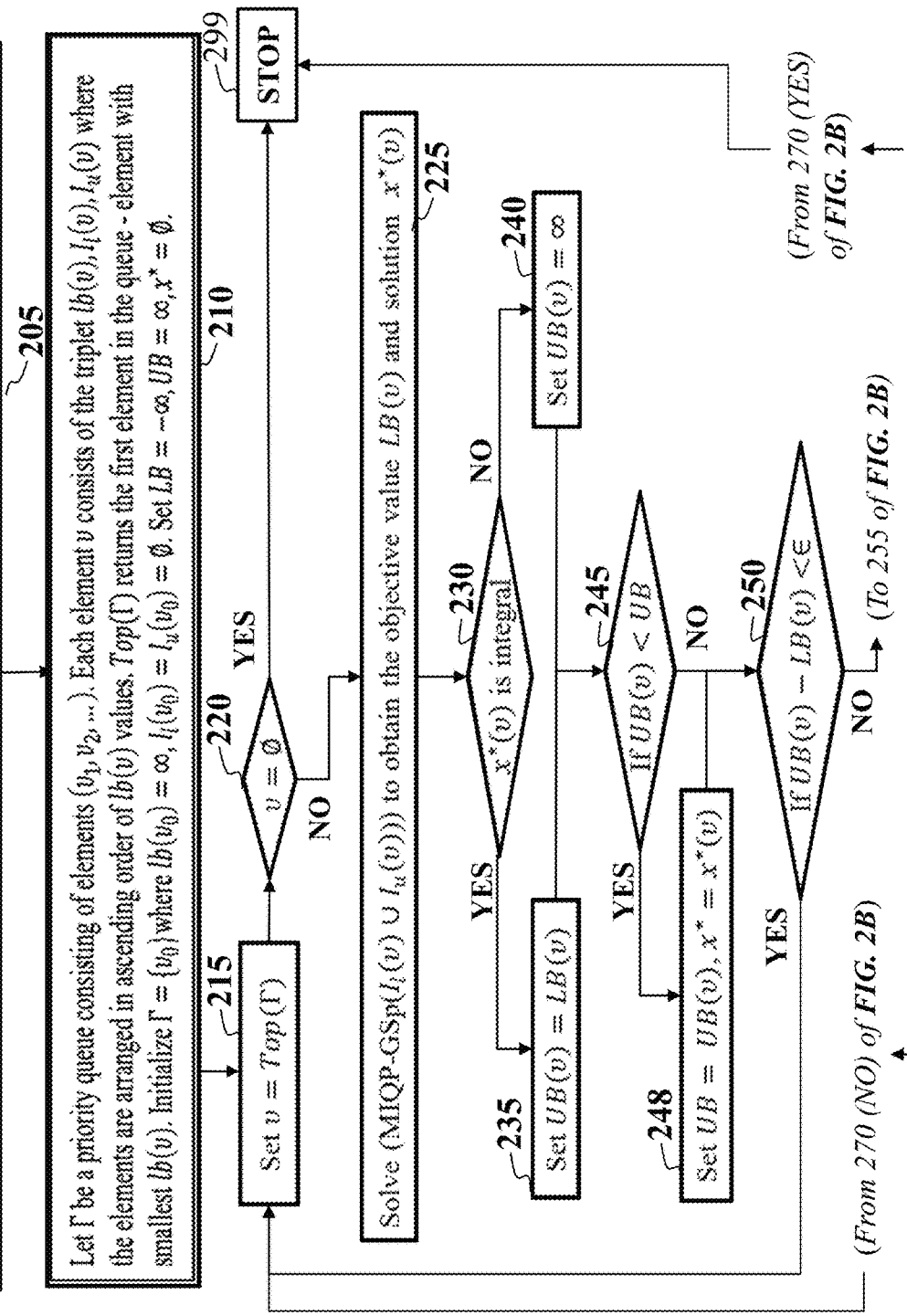
FIG. 2A and FIG. 2B illustrate a flowchart of some steps in the Branch and Bound Algorithm, according to some embodiments of the present disclosure.
Figure 2B:
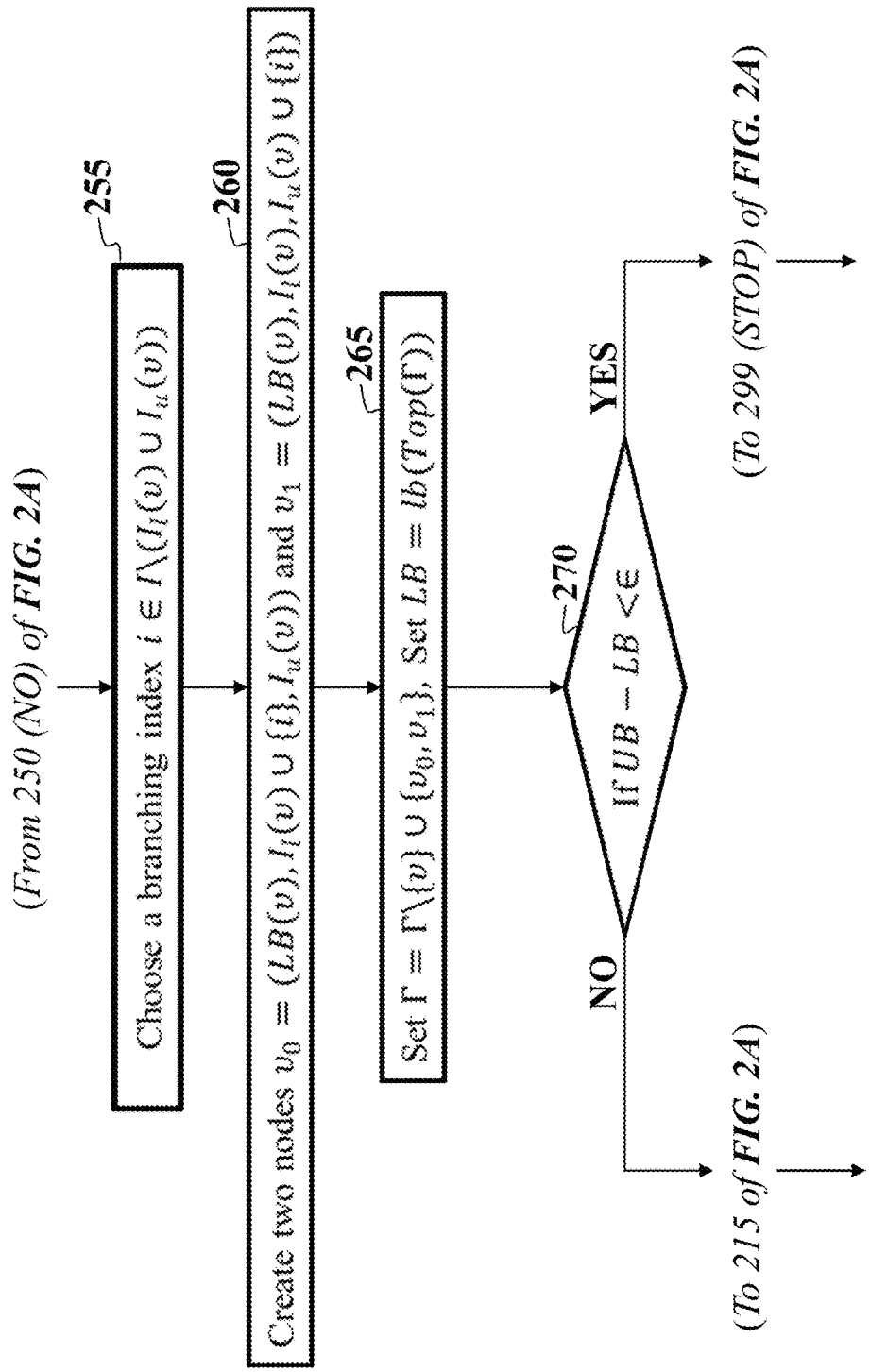

FIG. 2A and FIG. 2B illustrate a flowchart of some steps in the Branch and Bound Algorithm (standard), according to some embodiments of the present disclosure.

Flow Steps for Branch and Bound Algorithm (Embodiment)

Given sets $I_l, I_u \subset I$ that are disjoint, define the optimization problem $$\min_x \quad x^T Q x + q^T x + \lambda_g (x^T x - (l+u)^T x + l^T u) \quad \text{(MIQP-GSp}(I_l, I_u))$$

$$\text{s.t.} \quad Ax = b, \; Cx \leq d$$

$$l \leq x \leq u$$

$$x_i = l_i \text{ for } i \in I_l, \; x_i = u_i \text{ for } I_u$$

where the parameter $\lambda_g$ is now computed as $\lambda_g = \max(0, -\sigma_{g,min}(Q, A, \delta))$ for some δ sufficiently large.

Still referring to FIGS. 2A and FIG. 2B, FIG. 2A and FIG. 2B presents the steps of Algorithm Branch-and-Bound in a flowchart. The algorithm proceeds by receiving input data 205 according for Step 1 of Algorithm Branch-and-Bound. The algorithm then initialized key quantities 210 according to Step 2 of Algorithm Branch-and-Bound. The top of the priority queue r is retrieved 215. If there is no such element 220 then the algorithm terminates. Otherwise the algorithm proceeds to solve (MIQP–GSp($I_l(v) \cup I_u(v)$)) to obtain the objective value LB(v) and solution x*(v) 225. If the solution is integral 230 then the algorithm updated the upper bound UB(v)=LB(v), stores a new solution 235 and else sets UB(v)=∞ 240. Then the algorithm proceeds to check if the new upper bound UB(v) improves on UB 245. If true, the new upper bound and solution are updated 248. Otherwise the algorithm checks if the upper bound and lower bound for the particular element are less than the specified tolerance UB(v)−LB(v)<∈250. If true, then algorithm proceeds to the next element in the priority queue 215. Otherwise the algorithm chooses a branching variable and creates two nodes 260 that are added to the priority queue and updated the lower bound as LB=lb(Top(Γ)) 265. Finally, the algorithm checks to see if the lower and upper bounds are smaller than the specified tolerance UB−LB<∈. If yes, then the algorithm terminates. Otherwise the algorithm proceeds to pick the next element in the priority queue 215.

The flow steps for the branch-and bound algorithm (standard) generalized spectral relaxation are repeated in step number format as follows:

1. Problem data: Q, q, A, b, C, d, l, u, I for the definition of mixed integer quadratic programming problem (MIQP). User tolerance ∈>0–(205 of FIG. 2A).
2. Let Γ be a priority queue consisting of elements $(v_1, v_2, \ldots)$. Each element v consists of the triplet lb(v), $I_l(v), I_u(v)$ where the elements are arranged in ascending order of lb(v) values. Top(Γ) returns the first element in the queue-element with smallest lb(v)—(210 of FIG. 2A).
3. Initialize Γ={$v_0$}, where lb($v_0$)=∞, $I_l(v_0)$=$I_u(v_0)$=∅. Set LB=−∞, UB=∞, x*=∅.
4. Set v=Top (Γ)—(215 of FIG. 2A). If no such element exists—(220 of FIG. 2A), then STOP—(299 of FIG. 2A).
5. Solve (MIQP–GSp($I_l(v) \cup I_u(v)$)) to obtain the objective value LB(v) and solution x*(v)—(225 of FIG. 2A).
6. If x*(v) is integral—(230 of FIG. 2A), then set UB(v)=LB(v)—(235 of FIG. 2A). Else set UB(v)=∞—(240 of FIG. 2A).
7. If UB(v)<UB—(245 of FIG. 2A), then set UB=UB(v), x*=x*(v)—(248 of FIG. 2A).
8. If UB(v)−LB(v)<∈—(250 of FIG. 2A) is less than a user specified tolerance then go to Step 3. Otherwise, choose a branching index i∈I\($I_l(v) \cup I_u(v)$)—(255 of FIG. 2B).
9. Create two nodes $v_0$=(LB(v), $I_l(v) \cup \{i\}$, $I_u(v)$) and $v_1$=(LB(v), $I_l(v)$, $I_u(v) \cup \{i\}$)—(260 of FIG. 2B).
10. Set Γ=Γ\{v}∪{$v_0, v_1$}—(265 of FIG. 2B).
11. Set LB=lb(Top(Γ))—(265 of FIG. 2B).
12. If UB−LB<∈—(270 of FIG. 2B) is less than a user specified tolerance then STOP (299 of FIG. 2A). Else go to Step 3.

Figure 2C:
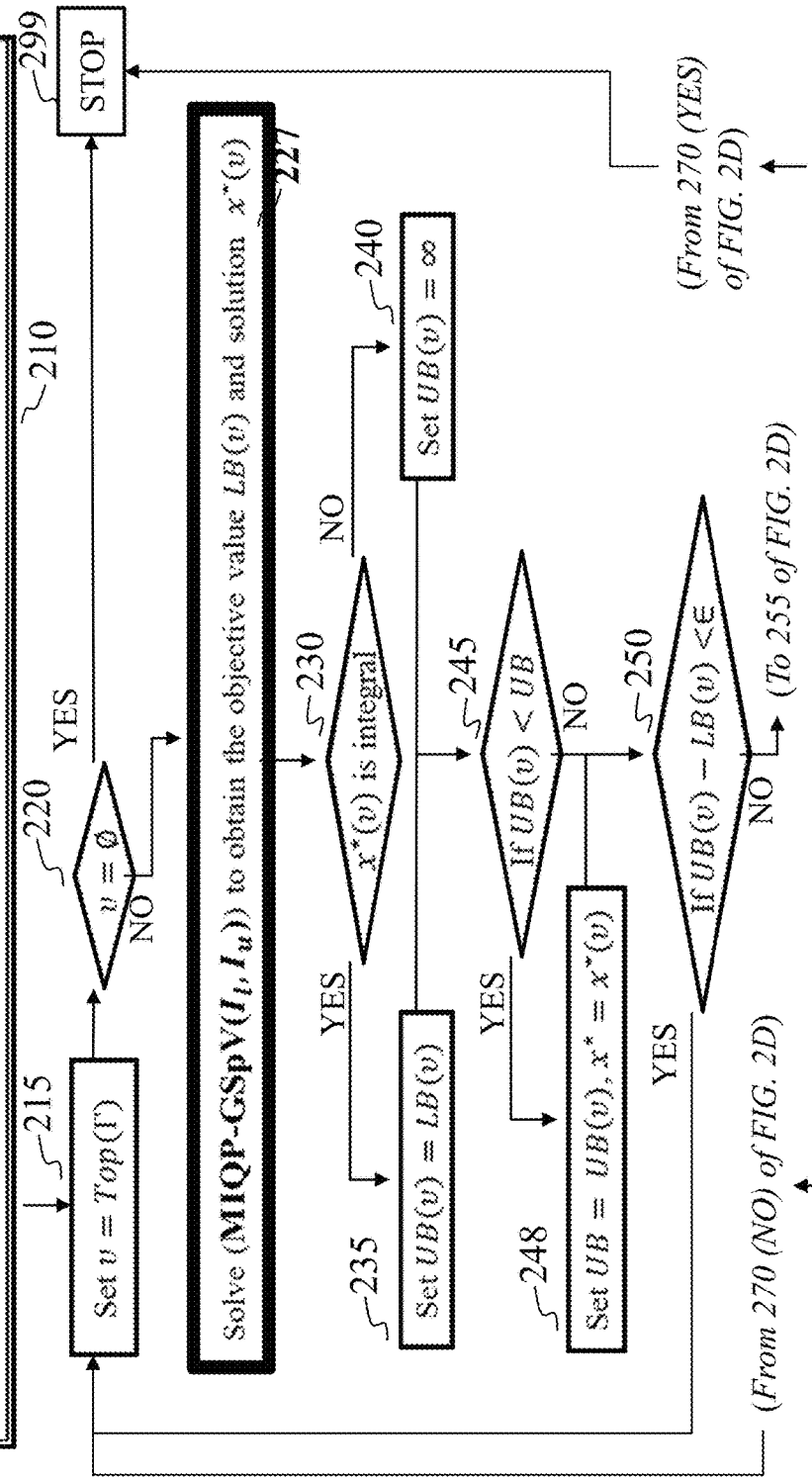

FIG. 2C and FIG. 2D illustrate a flowchart of some steps in an improved Branch and Bound Algorithm, in particular, Step 5 of FIG. 2A is changed to now solve (MIQP–GSpV($I_l$, $I_u$))—(227 of FIG. 2C), thus replacing (MIQP–GSp($I_l$, $I_u$)) of Step 5 of FIG. 2A, according to some embodiments of the present disclosure.

Flow Steps for An Improved Branch and Bound Algorithm (Another Embodiment)

In the standard branch and bound algorithm the parameter $\lambda_g$ is kept fixed for all nodes in the search tree.

A key realization of the present disclosure is that when a subset of the variables are fixed to the lower or upper bound then an improved value of the parameter $\lambda_g$ can be computed. This improved value results in a stronger relaxation as compared to using the fixed value.

An alternate embodiment to FIGS. 2A & 2B and FIGS. 2C & 2D, accordingly, in new embodiment of the present disclosure the relaxation parameter is changed at every node in the search tree. The relaxation that is solved is given, for sets $I_l, I_u \subset I$ that are disjoint, as $$\min_x x^T Q x + q^T x + \lambda_g(I_l \cup I_u)(x^T x - (l+u)^T x + l^T u) \quad \text{(MIQP-GSpV}(I_l, I_u))$$
$$\text{s.t.} \quad Ax = b, Cx \leq d$$
$$l \leq x \leq u$$
$$x_i = l_i \text{ for } i \in I_l, x_i = u_i \text{ for } I_u$$

where the parameter $\lambda_g(I_l \cup I_u)$ is now computed as $\lambda_g(I_l \cup I_u) = \max(0, -\sigma_{g,min}(W, A, \delta; I_l \cup I_u))$ where $$\sigma_{g,min}(Q, A, \delta; I_l \cup I_u) = \min_{u: u_i = 0 \text{ for } i \in ;I_l \cup I_u} \frac{u^T Q u}{u^T(I + \delta A^T A) u}$$

and $u_{g,min}(I_l \cup I_u)$ is the eigenvector corresponding to the generalized eigenvalue $\sigma_{g,min}(Q, A, \delta; I_l \cup I_u)$. The quantities $\lambda_g(I_l \cup I_u)$ and $u_{g,min}(I_l \cup I_u)$ clearly depend on the choice of parameter δ. This has suppressed in the notation for the sake of brevity.

In the above, the $\sigma_{g,min}(Q, A, \delta; I_l \cup I_u)$ can be recognized as the smallest generalized eigenvalue that is obtained from eliminating the variables corresponding indices in $I_l \cup I_u$.

The improved branch-and bound algorithm with generalized spectral relaxation follows the same Steps 1-12 in Algorithm Branch-and-Bound. At least one key difference is that in Step 5 the improved branch and bound algorithm solves (MIQP–GSpV($I_l$, $I_u$)) instead of (MIQP–GSp($I_l$, $I_u$)).

Spectral Branching—Improved Step 8, A New Eigenvalue-Based Branching Rule is Discovered (Another Embodiment)

In addition to the relaxations, the choice of branching plays a key role in determining the computational time for solving mixed integer quadratic programming problem (MIQP).

In the above algorithm, the choice of branching index (Step 8) is very important to the efficiency of the branch-and-bound algorithm. The improved branch and bound algorithm exploits the fact that the parameter $\lambda_g$ in the relaxation can be reduced (improved) when variables are fixed. Then, a good branching rule can be posited as one in which the resulting problem has best possible reduction in the parameter $\lambda_g$.

Accordingly, in one embodiment of the present disclosure, a new eigenvalue-based branching rule is developed.

In this context, a good branching rule consists in selecting the variable index i which leads to the largest increase in the smallest eigenvalue of $\lambda_g(I_l \cup I_u \cup \{i\})$.

Such an index, denoted as $i_{exact}$ is obtained as $$i_{exact} = \arg\max_{i \in I \setminus \{I_l \cup I_u\}} \lambda_g(I_l \cup I_u \cup \{i\})$$

There is no efficient approach to obtaining $i_{exact}$ that avoids complete enumeration. Solving a sequence of eigenvalue problems at every node of the branch-and-bound tree is computationally expensive.

A key realization of the present disclosure is the realization of the following rule that significantly reduces the computational time and achieves the same efficiency as the exact rule. The spectral branching rule defines the index $i_{approx}$ as $$i_{approx} = \arg\max_{i \in I \setminus \{I_l \cup I_u\}} |u_{g,min}(I_l \cup I_u)|_i$$

i.e. the largest component of $|u_{g,min}(I_l \cup I_u)|$.

In one embodiment of the present disclosure, the improved branch and bound algorithm is combined with the spectral branching rule in Step 8 to obtain an improved algorithm.

Quadratic Cutting Surface-Based Relaxation

In another embodiment of the invention, a quadratic cutting surface-based relaxation is realized for solving the mixed integer quadratic programming problem (MIQP).

The quadratic cutting surface relaxation is $$\min_{x,y,z} \quad z + q^T x \quad \text{(MIQP-QCutSurf)}$$
$$\text{s.t.} \quad Ax = b, Cx \leq d$$
$$l \leq x \leq u$$
$$z \geq x^T(Q + \text{diag}(d))x - d^T y \, \forall \, d \in D$$
$$L_i(x_i) \leq y_i \leq U_i(x_i)$$

where d is a vector and diag(d) is a diagonal matrix with d on the diagonal such that (Q+diag(d)) is positive semidefinite. The set D consists of a possibly infinite set of such vectors. However, these vectors are generated in an iterative manner. The functions $L_i(x_i)$, $U_i(x_i)$ are respectively the convex lower and concave upper envelopes of $x_i^2$ on the interval $[l_i, u_i]$. This formulation is more general than the relaxation in (MIQP–GSp).

The set D is computed iteratively as follows and is similar to Algorithm 1 in Hongbo Dong, Relaxing Nonconvex Quadratic Functions by Multiple Adaptive Diagonal Perturbations, Siam J. Optim, Vol. 26, No. 3, pp. 1962-1985, 2016.

Algorithm QCutSurf

Set $D^1 = \{\lambda \cdot 1\}$ where 1 is vector all ones and $\lambda > \max(0, -\sigma_{g,min}(Q, A, \delta))$;

For k=1 to Max iterations do

Solve (MICQP–QCutSurf); Let $(\bar{x}, \bar{y}, \bar{z})$ be an optimal solution.

Separation: Find a diagonal perturbation $d^{new}$: Q+diag(d)+$\delta A^T A$ is positive semidefinite If the inequality $z \geq x^T(Q+\text{diag}(d))x - d^T y$ is violated for $(\bar{x}, \bar{y}, \bar{z})$ for the given $d^{new}$ then Set $D^{k+1} = D^k \cup \{d^{new}\}$ Else Terminate;

At the termination of the above algorithm a candidate set D of directions are obtained and the obtained optimal objective value is a lower bound for the (MIQP).

The key step in the Algorithm QCutSurf is the computation of a $d^{new}$:Q+diag(d)+$\delta A^T A$ is positive semidefinite. This is obtained by solving the following problem $$\min_d \quad \sum_{i=1}^n g_i(d_i) \quad \text{(SEP)}$$
$$\text{s.t.} \quad Q + \text{diag}(d) + \delta A^T A \text{ is positive semidefinite}$$

where the function $g_i(d_i)$ is defined as $$g_i(d_i) = \begin{cases} y_i - \bar{x}_i^2 + \lambda & \text{if } d_i \geq 0 \\ y_i - \bar{x}_i^2 & \text{otherwise} \end{cases}.$$

The separation problem in (SEP) can be readily solved using the barrier coordinate minimization algorithm presented as Algorithm 2 in Hongbo Dong, Relaxing Nonconvex Quadratic Functions by Multiple Adaptive Diagonal Perturbations, Siam J. Optim, Vol. 26, No. 3, pp. 1962-1985, 2016.

The relaxation that is solved, for sets $I_l, I_u \subset I$ that are disjoint, is given by $$\min_{x,y,z} \quad z + q^T x \quad \text{(MIQP-QCutSurf}(I_l, I_u))$$
$$\text{s.t.} \quad Ax = b, Cx \leq d$$
$$l \leq x \leq u$$
$$z \geq x^T(Q + \text{diag}(d))x - d^T y \, \forall \, d \in D$$
$$x_i = l_i \text{ for } i \in I_l, x_i = u_i \text{ for } I_u$$

The problem (MIQP–QCutSurf($I_l, I_u$)) is solved in a manner identical to that described in Algorithm QCutSurf. The only modification to that algorithm is that initial diagonal perturbation is obtained as $D^1 = \{\lambda \cdot 1\}$ where 1 is vector all ones and $\lambda > \max(0, -\sigma_{g,min}(Q, A, \delta; I_l, I_u))$. The rest of the steps follow without any change.

The standard branch-and-bound algorithm presented earlier can be used in conjunction with the quadratic cutting surface relaxation in (MIQP–QCutSurf($I_l, I_u$)) to obtain an algorithm to solve the (MIQP).

The Quadratic Cutting Surface branch-and bound algorithm has the same Steps 1-12 in Algorithm Branch-and-Bound. The key difference is that in Step 5, the Quadratic Cutting Surface branch-and-bound algorithm solves (MIQP–QCutSurfV($I_l, I_u$)) instead of (MIQP–GSp($I_l, I_u$)).

The branching rule for this algorithm follows the spectral branching rule described previously.

Figure 3:
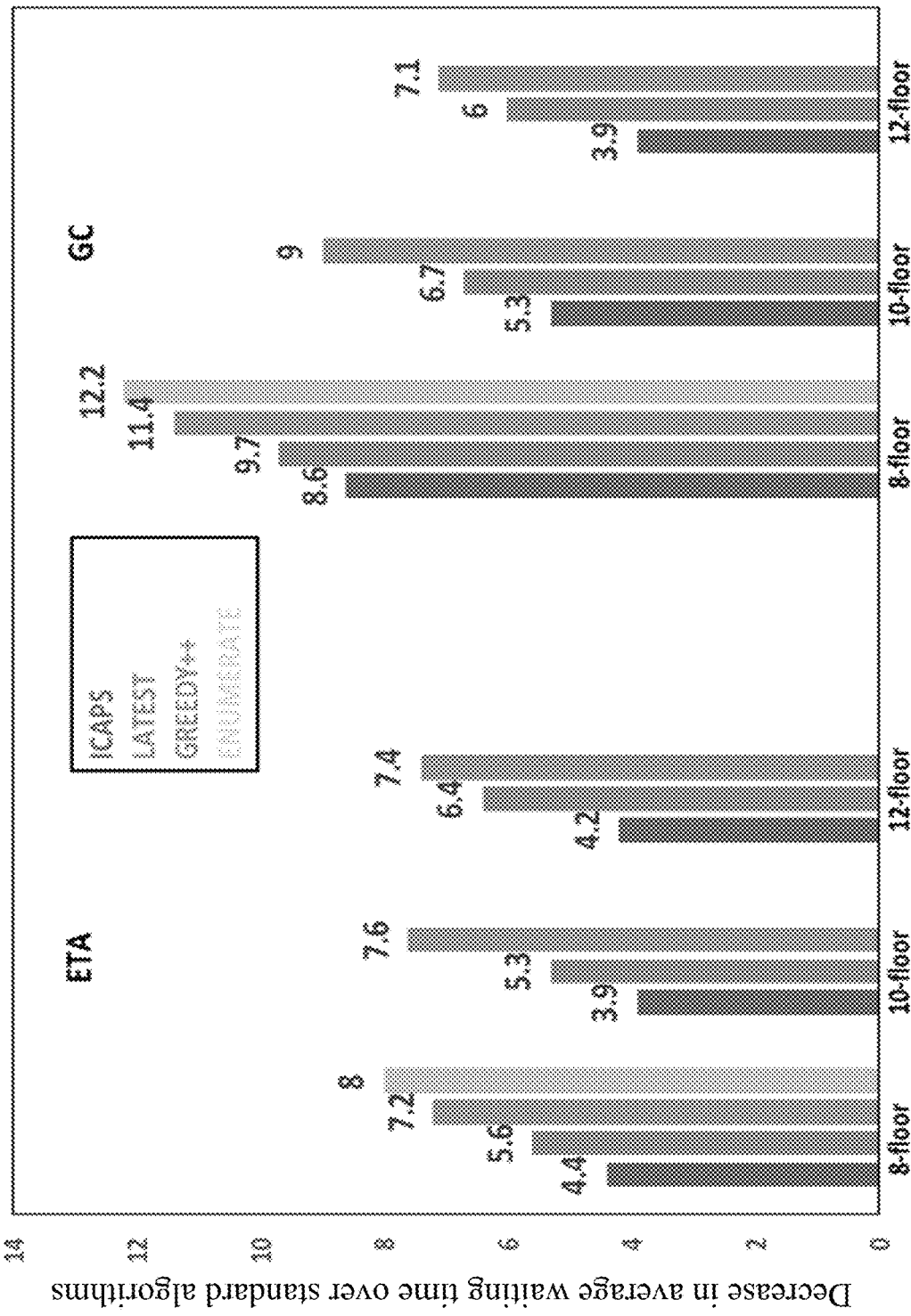
FIG. 3 is a schematic illustrating an expected decrease in average waiting times in different building sizes when using different algorithms for performing the elevator scheduling, according to the present disclosure.

FIG. 3 is a schematic illustrating an expected decrease in average waiting times in different building sizes when using different algorithms for performing the elevator scheduling, according to the present disclosure. Specifically, FIG. 3 shows an improvement in the average waiting time over an existing scheduling algorithm by: ICAPS, LATEST—greedy optimization algorithm, GREEDY+—improvement over LATEST, ENUMERATE—optimal solution, which demonstrates the value of obtaining the true optimal solution, according to results from experimentation.

Figure 4:
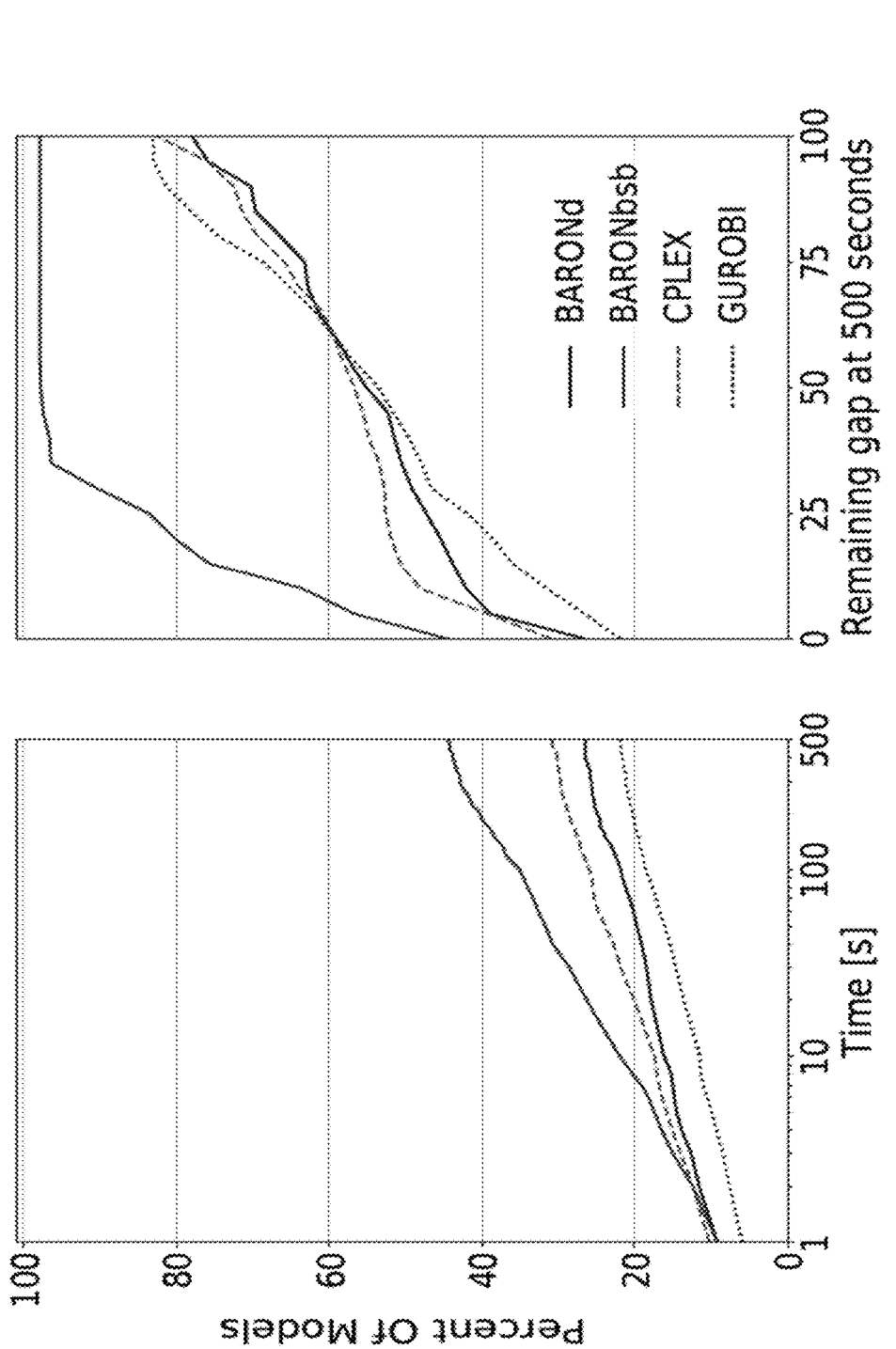
FIG. 4 is a graph that plots a comparison of the performance of the relaxation according to some embodiments of the present disclosure against commercial optimization algorithms on a library of test problems, according to the present disclosure.

FIG. 4 is a graph that plots a comparison of the performance of the relaxation according to some embodiments of the present disclosure against commercial optimization algorithms on a library of test problems, according to the present disclosure. Specifically, FIG. 4 shows the performance of the proposed algorithm of the methods and systems of the present disclosure on general Mixed Integer Quadratic Programs. The solver CPLEX and GUROBI are state-of-the-art commercial solvers. From the FIG. 4, it is clear that the proposed relaxation according to some embodiments of the algorithm and the branching strategy outperform the commercial solvers.

Figure 5:
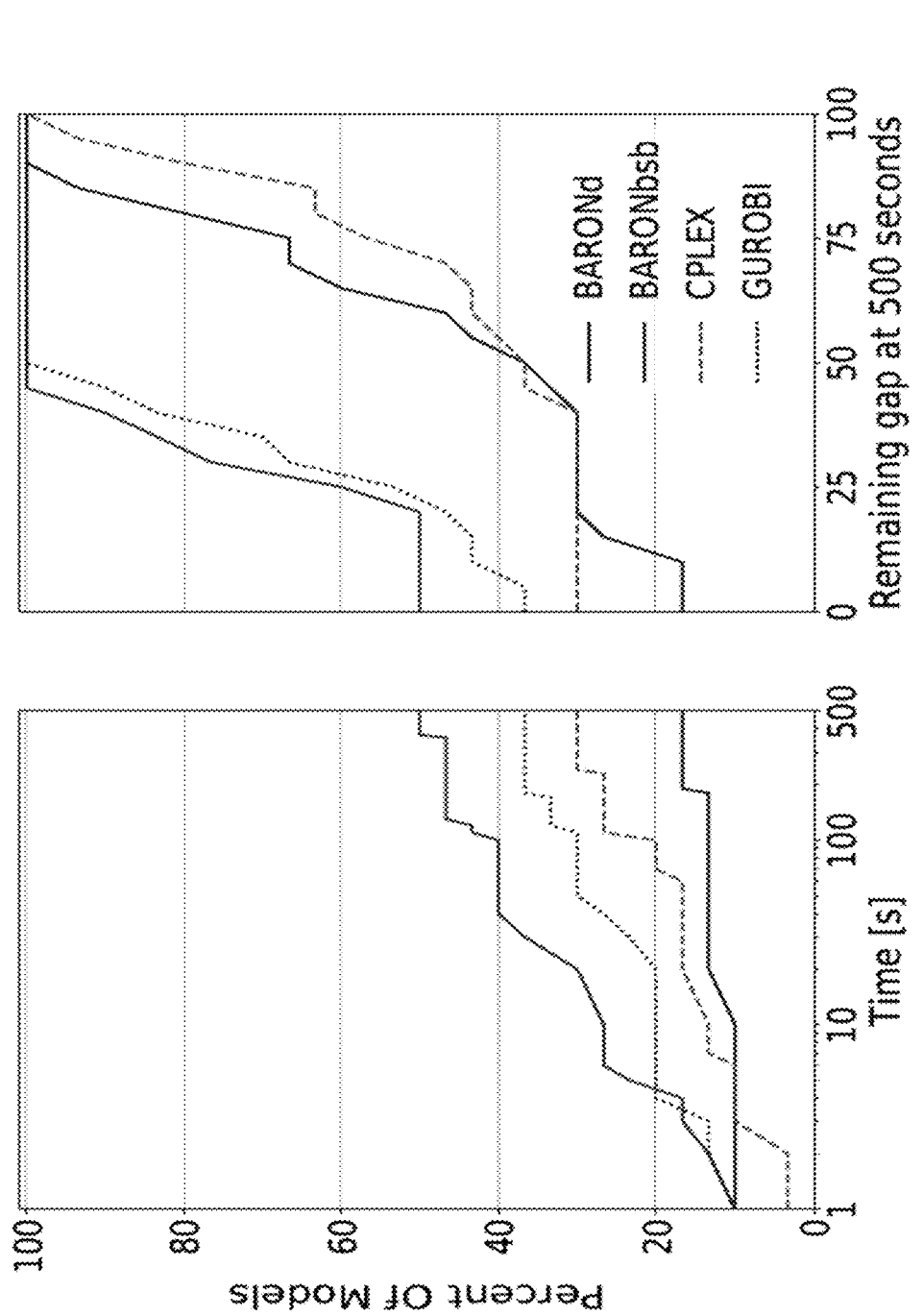
FIG. 5 is a graph that plots a comparison of the performance of the relaxation according to some embodiments of the present disclosure against commercial optimization algorithms on a library of test problems, according to the present disclosure.

FIG. 5 is a graph that plots a comparison of the performance of the relaxation according to some embodiments of the present disclosure against commercial optimization algorithms on a library of test problems, according to the present disclosure. FIG. 5 shows the performance of the proposed algorithm of the methods and systems of the present disclosure on Quadratic Semi-Assignment Problems. (QSAPs) such as the ones proposed in this paper. The solver CPLEX and GUROBI are state-of-the-art commercial solvers. From FIG. 5, it is clear that the proposed relaxation according to some embodiments of the algorithm and the branching strategy that out performs the commercial solvers.

Features

According to another embodiment of the present disclosure, a system for controlling a movement of a plurality of elevator cars of an elevator system. The system including at least one input interface for accepting a plurality of hall calls requesting service of the plurality of elevator cars to different floors of a building. A processor in communication with the input interface is configured to determine, for each elevator car, an individual waiting time of accommodating each hall call, if the hall call is the only hall call assigned to the elevator car. Determine, for each pair of hall calls assigned to each elevator car, a pairwise delay over the individual waiting time of each hall call in the pair caused by a joint assignment of the elevator car to accommodate the pair of the hall calls. Approximate a cumulative waiting time of an assignment of the plurality of elevator cars to accommodate the plurality of hall calls as a sum of individual waiting times for accommodating each hall call with the assigned elevator car, and a sum of all pairwise delays determined between all pairs of hall calls assigned to the same elevator car. Determine the assignment of the plurality of elevator cars using a branch and bound algorithm using spectral relaxations based on a generalized eigenvalue and spectral branching that assigns the plurality of hall calls to the plurality of elevator cars to minimize the approximated cumulative waiting time. A controller for controlling the movement of the plurality of elevator cars according to the assignment. Wherein the following aspects either each aspect can modify the above embodiment to create a modified embodiment, or two or more aspects or any combination of multiple aspects can create one or more modified embodiments of the above embodiment.

According to aspects of the present disclosure, wherein the branch and bound algorithm uses the spectral relaxations based on the generalized eigenvalue and the spectral branching to identify a branching variable, such that the branching variable takes on a value of 1 when a passenger i is assigned to a car c, or the branching variable takes on a value of 0. An aspect of the above embodiment can include the branch and bound algorithm including a parameter $\lambda_g$ that is kept fixed for all nodes in a search tree.

According to an aspect of the disclosure, the branch and bound algorithm uses the spectral relaxations, such that spectral relaxations include a relaxation parameter that is changed at every node in a search tree. Another aspect can include the branch and bound algorithm uses the spectral relaxations based on the generalized eigenvalue and the spectral branching to identify a branching variable, such that the branching variable is chosen based on the branching variable that is most fractional, that is closest to half.

Further still, an aspect may be that the generalized eigenvalue is computed using a sufficiently large value of the multiplicative factor for the equality constraints, such that the multiplicative factor for the equality constraints is a scalar constant δ, that is greater than or equal to 1. Also possible is that an aspect may be that the generalized eigenvalue is computed using a value of 1 for the multiplicative factor for the equality constraints.

According to another embodiment of the present disclosure, a method for scheduling elevator cars of an elevator system. The method including using at least one input interface for accepting a plurality of hall calls requesting the plurality of elevator cars to different floors of a building. Determining independently, using a processor in communication with the input interface, for each elevator car, an independent waiting time of accommodating each hall call, if the hall call is the only hall call assigned to the elevator car. Determining, for each pair of hall calls assigned for each elevator car, a pairwise delay over the individual waiting time of each hall call in the pair caused by a joint assignment of the elevator car to accommodate the pair of the hall calls. Approximating a cumulative waiting time of an assignment of the plurality of elevator cars to accommodate the plurality of hall calls as a sum of individual waiting times for accommodating each hall call with the assigned elevator car and a sum of all pairwise delays (SPD) determined for the assigned elevator car between all pairs of hall calls assigned to the same elevator car. Determining the assignment of the plurality of elevator cars using a branch and bound algorithm using quadratic cutting surface algorithm and spectral branching that assigns the plurality of hall calls to the plurality of elevator cars to minimize the approximated cumulative waiting time. Using a controller for controlling the movement of the plurality of elevator cars according to the assignment. Wherein the following aspects either each aspect can modify the above embodiment to create a modified embodiment, or two or more aspects or any combination of multiple aspects can create one or more modified embodiments of the above embodiment.

According to an aspect of the disclosure, the use of the SPD converts an optimization approach from a Semi-Assignment Problem to a Quadratic Semi-Assignment Problem (QSAP), such that the QSAP is optimized by reformulating the QSAP as a general mixed integer quadratic programming problem (MIQP), wherein solving for the MIQP using the branch and bound algorithm includes employing a relaxation in order to yield an optimum lower bound. According to another aspect of the disclosure, the quadratic cutting surface algorithm (QCSA) is used to obtain lower bounds on the MIQP, and the QCSA is also used in conjunction with the branch-and-bound algorithm to obtain an algorithm to solve the MIQP, such that the lower bounds obtained by the QCSA on the MIQP is a level of improvement that is above a level of improvement of lower bounds obtained using spectral relaxations on the MIQP.

According to another embodiment of the present disclosure, a method for scheduling elevator cars of an elevator system. The method including using at least one input interface for accepting a plurality of hall calls requesting the plurality of elevator cars to different floors of a building. Determining independently, using a processor in communication with the input interface, for each elevator car, an independent waiting time of accommodating each hall call, if the hall call is the only hall call assigned to the elevator car. Determining, for each pair of hall calls assigned for each elevator car, a pairwise delay over the individual waiting time of each hall call in the pair caused by a joint assignment of the elevator car to accommodate the pair of the hall calls. Approximating a cumulative waiting time of an assignment of the plurality of elevator cars to accommodate the plurality of hall calls as a sum of individual waiting times for accommodating each hall call with the assigned elevator car and a sum of all pairwise delays determined for the assigned elevator car between all pairs of hall calls assigned to the same elevator car. Determining the assignment of the plurality of elevator cars using a branch and bound algorithm using spectral relaxations based on a generalized eigenvalue and spectral branching that assigns the plurality of hall calls to the plurality of elevator cars to minimize the approximated cumulative waiting time. Using a controller for controlling the movement of the plurality of elevator cars according to the assignment. Wherein the following aspects either each aspect can modify the above embodiment to create a modified embodiment, or two or more aspects or any combination of multiple aspects can create one or more modified embodiments of the above embodiment.

According to an aspect of the disclosure, the branch and bound algorithm includes a parameter $\lambda_g$ that is kept fixed for all nodes in a search tree. Another aspect can include the branch and bound algorithm uses the spectral relaxations, such that spectral relaxations include a relaxation parameter that is changed at every node in a search tree. Still another aspect can include the branch and bound algorithm uses the spectral relaxations based on the generalized eigenvalue and the spectral branching to identify a branching variable, such that the branching variable is chosen based on the branching variable that is most fractional, that is closest to half.

Another aspect can include the generalized eigenvalue is computed using a sufficiently large value of the multiplicative factor for the equality constraints, such that the multiplicative factor for the equality constraints is a scalar constant $\delta$, that is greater than or equal to 1. Further, another aspect can include the branch and bound algorithm uses the spectral relaxations based on the generalized eigenvalue and the spectral branching to identify a branching variable, such that the branching variable takes on a value of 1 when a passenger i is assigned to a car c, or the branching variable takes on a value of 0.

According to another embodiment of the present disclosure, a non-transitory computer readable storage medium embodied thereon a program executable by a computer for performing a method. The method for scheduling elevator cars of an elevator system, the elevator system including a plurality of elevator cars, and a plurality of hall calls. The method including using at least one input interface for accepting a plurality of hall calls requesting the plurality of elevator cars to different floors of a building. Determining independently, using a process in communication with the input interface, for each elevator car, an independent waiting time of accommodating each hall call, if the hall call is the only hall call assigned to the elevator car. Determining, for each pair of hall calls assigned for each elevator car, a pairwise delay over the individual waiting time of each hall call in the pair caused by a joint assignment of the elevator car to accommodate the pair of the hall calls. Approximating a cumulative waiting time of an assignment of the plurality of elevator cars to accommodate the plurality of hall calls as a sum of individual waiting times for accommodating each hall call with the assigned elevator car and a sum of all pairwise delays determined for the assigned elevator car between all pairs of hall calls assigned to the same elevator car. Determining the assignment of the plurality of elevator cars using a branch and bound algorithm using spectral relaxations based on a generalized eigenvalue and spectral branching that assigns the plurality of hall calls to the plurality of elevator cars to minimize the approximated cumulative waiting time. Using a controller for controlling the movement of the plurality of elevator cars according to the assignment. Wherein the following aspects either each aspect can modify the above embodiment to create a modified embodiment, or two or more aspects or any combination of multiple aspects can create one or more modified embodiments of the above embodiment.

According to an aspect of the disclosure, the branch and bound algorithm uses the spectral relaxations, such that spectral relaxations include a relaxation parameter that is changed at every node in a search tree. Another aspect can include the branch and bound algorithm uses the spectral relaxations, such that spectral relaxations include a relaxation parameter that is changed at every node in a search tree, and that the branch and bound algorithm includes a parameter $\lambda_g$ that is kept fixed for all nodes in a search tree. Further still, another aspect can include the branch and bound algorithm uses the spectral relaxations based on the generalized eigenvalue and the spectral branching to identify a branching variable, such that the branching variable takes on a value of 1 when a passenger i is assigned to a car c, or the branching variable takes on a value of 0.

The following aspects below can be incorporated into embodiments of the present disclosure.

At least one benefit of the aspect can be the greedy optimization algorithm is an algorithmic paradigm that determines at an initial step, an assignment of an unassigned first hall call, based on a locally optimal choice determined at a time of the initial step, then proceeds to the next step or the next successive unassigned hall call.

Another aspect can include the locally optimal choice identifies at each step, a combination of an unassigned hall call from all the remaining unassigned hall calls and an elevator car from the plurality of elevator cars, that results in a least increase in a waiting time for all assigned hall calls including the first hall call, while considering all previous assigned hall calls, then the combination is accepted and the hall call is assigned without further consideration and removed from all the remaining unassigned hall calls. Another aspect can include the greedy optimization algorithm starts with an empty set of assignments of hall calls needing to be assigned, such that at every step including an initial step which starts with a first hall call, is added to the set of assignments of hall calls needing to be assigned, so as to result in a total of N steps, until all unassigned hall calls are assigned. Another aspect can include each step in the total of N steps includes a hall call for every passenger to be moved between floors of the building, such that during each step, an unassigned hall call from a passenger is considered sequentially in time, and is initially added to an elevator car of the plurality of elevator cars successively. Another aspect can include for every combination of the hall call and the elevator car, the greedy optimization algorithm computes a cumulative waiting time of all hall calls assigned at that moment in time, plus the first hall call assigned at the initial step. Wherein the hall call and the elevator car combination having a least increase in the cumulative waiting time for all assigned hall calls including the first hall call of the initial step, the combination is accepted, and the hall call is assigned and removed from all the remaining unassigned hall calls, then continues to the next step or the next successive unassigned hall call.

Another aspect can the greedy optimization algorithm is based on optimizing the approximated cumulative waiting time in N steps, where N is a number of unassigned hall calls from passengers waiting to be assigned at a time at each step, such that two sets of coefficients are computed to construct a quadratic Boolean approximation of the cumulative waiting time of all the plurality of hall calls from passengers currently waiting to be assigned at the time of that step. Another aspect can include wherein the first set of coefficients of the two sets of coefficients includes $w_i^c$, such that $w_i^c$ is a linear coefficient that is an expected waiting time of a hall call from a passenger $h_i$, if the hall call is picked by an elevator car c, and no other hall call is picked up by that elevator car.

Another aspect can include the second set of coefficients of the two sets of coefficients includes $w_{ij}^c$, such that $w_{ij}^c$ is a bilinear coefficient that is equal to the pairwise delay between hall calls from passengers $h_i$ and $h_j$, based on a specific pick-up order of the two hall calls by the elevator car c, such that only one of the two hall calls is causing a delay to the other hall call, and the hall call that is picked-up first causes a delay for the hall call that is picked-up second.

According to another embodiment of the present disclosure, a method for scheduling elevator cars of an elevator system. The method including using at least one input interface for accepting a plurality of hall calls requesting the plurality of elevator cars to different floors of a building. Determining independently, using a processor in communication with the input interface, for each elevator car, an independent waiting time of accommodating each hall call, if the hall call is the only hall call assigned to the elevator car. Determining, for each pair of hall calls assigned for each elevator car, a pairwise delay over the individual waiting time of each hall call in the pair caused by a joint assignment of the elevator car to accommodate the pair of the hall calls. Approximating a cumulative waiting time of an assignment of the plurality of elevator cars to accommodate the plurality of hall calls as a sum of individual waiting times for accommodating each hall call with the assigned elevator car and a sum of all pairwise delays determined for the assigned elevator car between all pairs of hall calls assigned to the same elevator car. Determining the assignment of the plurality of elevator cars using a branch and bound algorithm using spectral relaxations based on a generalized eigenvalue and spectral branching that assigns the plurality of hall calls to the plurality of elevator cars to minimize the approximated cumulative waiting time. Using a controller for controlling the movement of the plurality of elevator cars according to the assignment. Wherein the following aspects below are contemplated as configuring a modified embodiment of the above embodiment.

According to aspects of the present disclosure, the greedy optimization algorithm is an algorithmic paradigm that determines at an initial step, an assignment of an unassigned first hall call, based on a locally optimal choice determined at a time of the initial step, then proceeds to the next step or the next successive unassigned hall call.

According to an aspect the cumulative waiting time is determined according to $$Q(x) B \sum_{i=1}^{N} \sum_{c=1}^{C} w_i^c x_i^c + \sum_{i=1}^{N} \sum_{j=i+1}^{N} \sum_{c=1}^{C} w_{ij}^c x_i^c x_j^c,$$

where is an indicator variable which takes on a value of 1 when the hall call from the passenger i is assigned to the elevator car c, and 0 otherwise, and that all N·C indicator variables are collected in a decision vector $x=[x_1^1, x_2^1, \ldots, x_N^1, x_1^2, x_2^2, \ldots, x_N^2, \ldots x_1^C, x_2^C, \ldots, x_N^C]$.

According to an aspect the greedy optimization algorithm has complexity $O(CN^2)$, that is, linear in a number of elevator cars C and quadratic in a number of hall calls by passengers N, and leverages a property of submodularity of an objective function. Wherein for each step, all remaining unassigned hall calls by passengers are considered sequentially in time, and are initially added to each elevator car successively, and for every combination of a hall call and an elevator car, the SPD of all hall calls assigned, plus the new hall call assigned at the initial step are then calculated, and any combination of the hall call initially added with the elevator car that increases the SPD least, then the hall call is assigned to that elevator car, and removed all the remaining unassigned hall calls, and then continues to the next step.

According to another embodiment of the present disclosure, a method non-transitory computer readable storage medium embodied thereon a program executable by a computer for performing a method. The method for scheduling elevator cars of an elevator system, the elevator system including a plurality of elevator cars, and a plurality of hall calls. The method includes using at least one input interface for accepting a plurality of hall calls requesting the plurality of elevator cars to different floors of a building. Determining independently, using a process in communication with the input interface, for each elevator car, an independent waiting time of accommodating each hall call, if the hall call is the only hall call assigned to the elevator car. Determining, for each pair of hall calls assigned for each elevator car, a pairwise delay over the individual waiting time of each hall call in the pair caused by a joint assignment of the elevator car to accommodate the pair of the hall calls. Approximating a cumulative waiting time of an assignment of the plurality of elevator cars to accommodate the plurality of hall calls as a sum of individual waiting times for accommodating each hall call with the assigned elevator car and a sum of all pairwise delays determined for the assigned elevator car between all pairs of hall calls assigned to the same elevator car. Determining the assignment of the plurality of elevator cars using a branch and bound algorithm using spectral relaxations based on a generalized eigenvalue and spectral branching that assigns the plurality of hall calls to the plurality of elevator cars to minimize the approximated cumulative waiting time. Using a controller for controlling the movement of the plurality of elevator cars according to the assignment. Wherein the following aspects below are contemplated as configuring a modified embodiment of the above embodiment.

According to aspects of the present disclosure, at least one benefit of the aspect can be the greedy optimization algorithm starts with an empty set of assignments of hall calls needing to be assigned, such that at every step including an initial step which starts with a first hall call, is added to the set of assignments of hall calls needing to be assigned, so as to result in a total of N steps, until all unassigned hall calls are assigned. Wherein, each step in the total of N steps includes a hall call for every passenger to be moved between floors of the building, such that during each step, an unassigned hall call from a passenger is considered sequentially in time, and is initially added to an elevator car of the plurality of elevator cars successively. Wherein for every combination of the hall call and the elevator car, the greedy optimization algorithm computes a cumulative waiting time of all hall calls assigned at that moment in time, plus the first hall call assigned at the initial step. Wherein the hall call and the elevator car combination having a least increase in the cumulative waiting time for all assigned hall calls including the first hall call of the initial step, the combination is accepted, and the hall call is assigned and removed from all the remaining unassigned hall calls, then continues to the next step or the next successive unassigned hall call.

Definitions

According to aspects of the present disclosure, and based on experimentation, the following definitions have been established, and certainly are not a complete definition of each phrase or term. Wherein the provided definitions are merely provided as an example, based upon learnings from experimentation, wherein other interpretations, definitions, and other aspects may pertain. However, for at least a mere basic preview of the phrase or term presented, such definitions have been provided.

Processor, by non-limiting example, as stated in claim 1 can be computer hardware, i.e. a logic circuitry that responds to and processes the basic instructions that drive a computer to implement the algorithm described in present disclosure.

Branch and bound (BB, B&B, or BnB) is an algorithm design paradigm for discrete and combinatorial optimization problems, as well as mathematical optimization. A branch-and-bound algorithm consists of a systematic enumeration of candidate solutions by means of state space search: the set of candidate solutions is thought of as forming a rooted tree with the full set at the root. The algorithm explores branches of this tree, which represent subsets of the solution set. Before enumerating the candidate solutions of a branch, the branch is checked against upper and lower estimated bounds on the optimal solution, and is discarded if it cannot produce a better solution than the best one found so far by the algorithm.

The algorithm can depend on efficient estimation of the lower and upper bounds of regions/branches of the search space. If no bounds are available, the algorithm degenerates to an exhaustive search.

A goal of a branch-and-bound algorithm is to find a value x that maximizes or minimizes the value of a real-valued function f(x), called an objective function, among some set S of admissible, or candidate solutions. The set S is called the search space, or feasible region. For example, this section assumes that minimization of f(x) is desired; such that this assumption comes without loss of generality, since one can find the maximum value of by finding the minimum of $g(x)=-f(x)$. A B&B algorithm can operate according to two principles:

It recursively splits the search space into smaller spaces, then minimizing f(x) on these smaller spaces; the splitting is called branching.

Branching alone would amount to brute-force enumeration of candidate solutions and testing them all. To improve on the performance of brute-force search, a B&B algorithm keeps track of bounds on the minimum that it is trying to find, and uses these bounds to "prune" the search space, eliminating candidate solutions that it can prove will not contain an optimal solution.

Turning these principles into a concrete algorithm for a specific optimization problem requires some kind of data structure that represents sets of candidate solutions. Such a representation is called an instance of the problem. Denote the set of candidate solutions of an instance I by $S_I$. The instance representation hs to come with three operations:

branch(I) produces two or more instances that each represent a subset of $S_I$. (Typically, the subsets are disjoint to prevent the algorithm from visiting the same candidate solution twice, but this is not required. However, the optimal solution among $S_I$ must be contained in at least one of the subsets)

bound(I) computes a lower bound on the value of any candidate solution in the space represented by I, that is, bound(I)≤f(x) for all x in $S_I$.

solution(I) determines whether I represents a single candidate solution. (Optionally, if it does not, the operation may choose to return some feasible solution from among $S_I$.)

Using these operations, a B&B algorithm performs a top-down recursive search through the tree of instances formed by the branch operation. Upon visiting an instance I, it checks whether bound(I) is greater than the lower bound for some other instance that it already visited; if so, I may be safely discarded from the search and the recursion stops. This pruning step is usually implemented by maintaining a global variable that records the minimum lower bound seen among all instances examined so far.

For example, a skeleton of a generic branch and bound algorithm is illustrated for minimizing an arbitrary objective function f. To obtain an actual algorithm from this, one would need a bounding function g, that computes lower bounds off on nodes of the search tree, as well as a problem-specific branching rule. As such, the generic algorithm presented here is a higher order function.

1. Using a heuristic, find a solution $x_h$ to the optimization problem. Store its value, $B=f(x_h)$. (If no heuristic is available, set B to infinity.) B will denote the best solution found so far, and will be used as an upper bound on candidate solutions.
2. Initialize a queue to hold a partial solution with none of the variables of the problem assigned.
3. Loop until the queue is empty:
    1. Take a node N off the queue.
    2. If N represents a single candidate solution x and f(x)<B, then x is the best solution so far. Record it and set B←f(x)
    3. Else, branch on N to produce new nodes $N_i$. For each of these:
        1. If bound($N_i$)>B, do nothing; since the lower bound on this node is greater than the upper bound of the problem, it will never lead to the optimal solution, and can be discarded.
        2. Else, store $N_i$ on the queue.

Several different queue data structures can be used. This FIFO queue-based implementation yields a breadth-first search. A stack (LIFO queue) will yield a depth-first algorithm. A best-first branch and bound algorithm can be obtained by using a priority queue that sorts nodes on their lower bound.

Quadratic programming (QP) is the process of solving a special type of mathematical optimization problem—specifically, a (linearly constrained) quadratic optimization problem, that is, the problem of optimizing (minimizing or maximizing) a quadratic function of several variables subject to linear constraints on these variables. Quadratic programming is a particular type of nonlinear programming. The problem formulation, such that the quadratic programming problem with n variables and m constraints can be formulated as follows. Given:

a real-valued, n-dimensional vector c,
an n×n-dimensional real symmetric matrix Q,
an m×n-dimensional real matrix A, and
an m-dimensional real vector b, where the objective of quadratic programming is to find an n-dimensional vector x, that will minimize $\frac{1}{2}x^T Q x + c^T x$
subject to $Ax \preceq b$, where $x^T$ denotes the vector transpose of X. The notation $Ax \preceq b$ means that every entry of the vector Ax is less than or equal to the corresponding entry of the vector b. A related programming problem, quadratically constrained quadratic programming, can be posed by adding quadratic constraints on the variables.

Relaxation is a modeling strategy. A relaxation is an approximation of a difficult problem by a nearby problem that is easier to solve. A solution of the relaxed problem provides information about the original problem. For example, a linear programming relaxation of an integer programming problem removes the integrality constraint and so allows non-integer rational solutions. A Lagrangian relaxation of a complicated problem in combinatorial optimization penalizes violations of some constraints, allowing an easier relaxed problem to be solved. Relaxation techniques complement or supplement branch and bound algorithms of combinatorial optimization; linear programming and Lagrangian relaxations are used to obtain bounds in branch-and-bound algorithms for integer programming.

Spectral Relaxation is a relaxation of a quadratic program that is obtained by perturbing the n×n-dimensional real symmetric matrix Q, the matrix in the objective function of the quadratic program, by a nonnegative, multiple α of the n×n-dimensional identity matrix I, which is a diagonal matrix with ones on the diagonal where the multiple α is obtained from eigenvalue computations. The choice of multiple α is such that the matrix Q+αI is positive semidefinite. In one relaxation, the multiple α is chosen as the maximum of zero and negative of the smallest eigenvalue of the matrix Q. The smallest eigenvalue of Q is defined as $$\min_u \frac{u^T Q u}{u^T u}.$$

If the quadratic program also has equality constraints Aeqx=beq, where the Aeq is meq×n-dimensional real matrix and beq is meq×1-dimensional vector, then the multiple α can be chose as the maximum of zero and negative of the smallest generalized eigenvalue which is obtained as $$\min_u \frac{u^T Q u}{u^T (I + \delta A^T A) u}$$

with δ a fixed positive scalar that is typically chosen to be greater than 1.

Upper bounds and Lower bounds: In mathematics, especially in order theory, an upper bound of a subset S of some partially ordered set (K, ≤) is an element of K which is greater than or equal to every element of S. The term lower bound is defined dually as an element of K which is less than or equal to every element of S. A set with an upper bound is said to be bounded from above by that bound, a set with a lower bound is said to be bounded from below by that bound. The terms bounded above (bounded below) are also used in the mathematical literature for sets that have upper (respectively lower) bounds. For example, of a lower bound in the set S={5, 8, 42, 34, 13934}, 5 is a lower bound for the set S; so is 4, if 4 belongs to the set K; but 6 is not as the set is ordered and 6 does not belong to set K. Another example may be for the set S={42}, the number 42 is both an upper bound and a lower bound; all other real numbers are either an upper bound or a lower bound for that set.

Every subset of the natural numbers has a lower bound, since the natural numbers have a least element (0, or 1 depending on the exact definition of natural numbers). An infinite subset of the natural numbers cannot be bounded from above. An infinite subset of the integers may be bounded from below or bounded from above, but not both. An infinite subset of the rational numbers may or may not be bounded from below and may or may not be bounded from above. Further, every finite subset of a non-empty totally ordered set has both upper and lower bounds.

Figure 6:
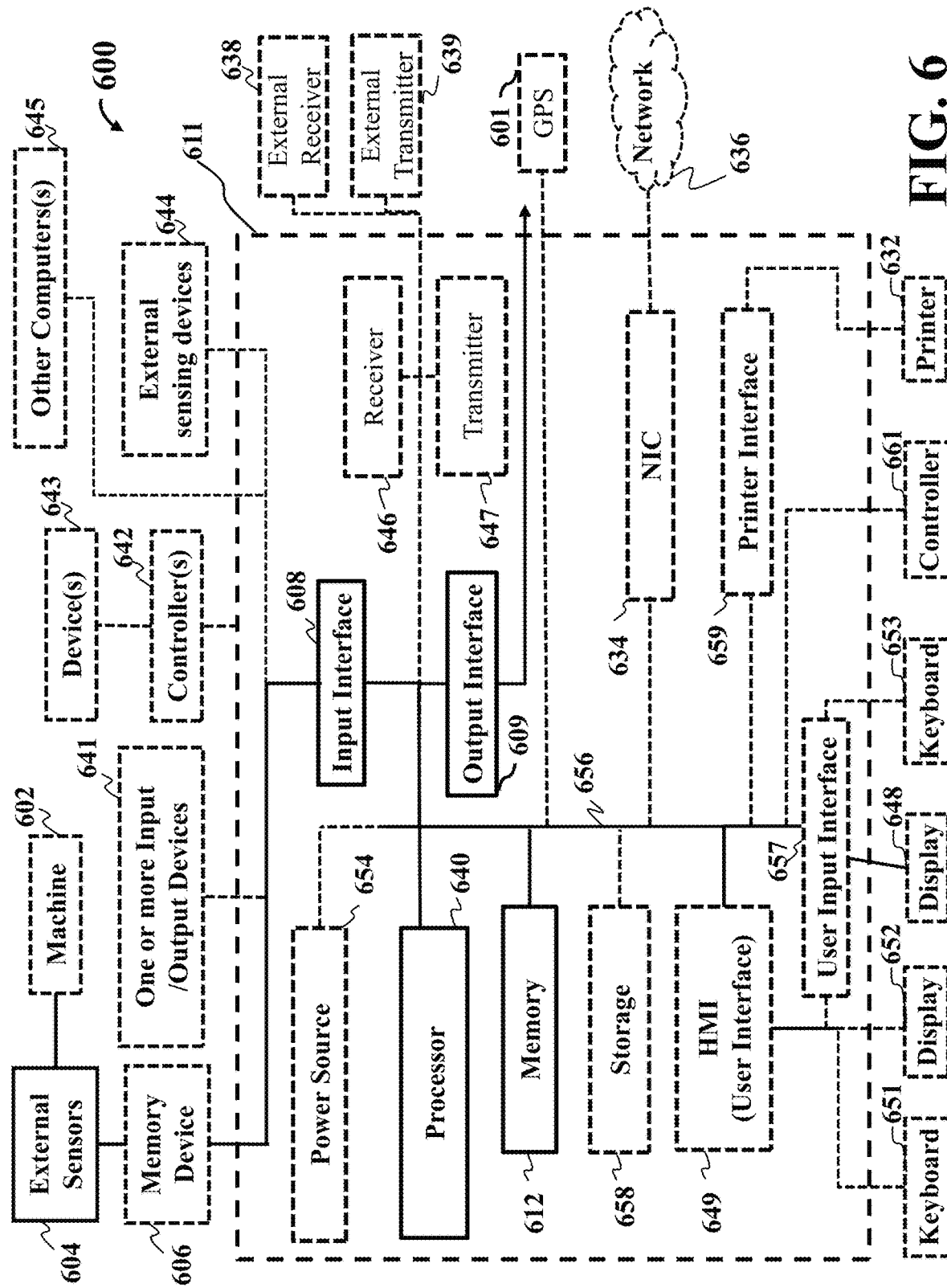
FIG. 6 is a block diagram of illustrating the method of FIG. 1A, that can be implemented using an alternate computer, according to some embodiments of the present disclosure.

FIG. 6 is a block diagram of illustrating the method of FIG. 1A, that can be implemented using an alternate computer, according to embodiments of the present disclosure. The components 600 can include a computer 611 having a processor 640, computer readable memory 612, storage 658 and user interface 649 with display 652 and keyboard 651, which are connected through bus 656. For example, the user interface 664 in communication with the processor 640 and the computer readable memory 612 acquires and stores the image data in the computer readable memory 612 upon receiving an input from a surface, keyboard 653, of the user interface 657 by a user.

The computer 611 can include a power source 654; depending upon the application the power source 654 may be optionally located outside of the computer 611. Linked through bus 656 can be a user input interface 657 adapted to connect to a display device 648, wherein the display device 648 can include a computer monitor, camera, television, projector, or mobile device, among others. A printer interface 659 can also be connected through bus 656 and adapted to connect to a printing device 632, wherein the printing device 632 can include a liquid inkjet printer, solid ink printer, large-scale commercial printer, thermal printer, UV printer, or dye-sublimation printer, among others. A network interface controller (NIC) 634 is adapted to connect through the bus 656 to a network 636, wherein image data or other data, among other things, can be rendered on a third party display device, third party imaging device, and/or third party printing device outside of the computer 611. The computer/processor 611 can include a GPS 601 connected to bus 656.

Still referring to FIG. 6, the image data or other data, among other things, can be transmitted over a communication channel of the network 636, and/or stored within the storage system 658 for storage and/or further processing. Further, the time series data or other data may be received wirelessly or hard wired from a receiver 646 (or external receiver 638) or transmitted via a transmitter 647 (or external transmitter 639) wirelessly or hard wired, the receiver 646 and transmitter 647 are both connected through the bus 656. The computer 611 may be connected via an input interface 608 to external sensing devices 644 and external input/output devices 641. The input interface 608 can be connected to one or more input/output devices 641, external memory 606, external sensors 604, which may be connected to a machine like device 602. A controller(s) 642 can be connected to device(s) 643. Further, other computer(s) 645 can be connected to the bus 656). For example, the external sensing devices 644 may include sensors gathering data before-during-after of the collected time-series data of the machine. The computer 611 may be connected to other external computers 642. An output interface 609 may be used to output the processed data from the processor 640. It is noted that a user interface 649 in communication with the processor 640 and the non-transitory computer readable storage medium 612, acquires and stores the region data in the non-transitory computer readable storage medium 612 upon receiving an input from a surface 652 of the user interface 649 by a user. Further, a controller 661 can be connected to the bus 656, to control devices associated with the embodiments of the systems and methods of the present disclosure.

EMBODIMENTS

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Further, embodiments of the present disclosure and the functional operations described in this specification can be implemented in digital electronic circuitry, in tangibly-embodied computer software or firmware, in computer hardware, including the structures disclosed in this specification and their structural equivalents, or in combinations of one or more of them. Further some embodiments of the present disclosure can be implemented as one or more computer programs, i.e., one or more modules of computer program instructions encoded on a tangible non transitory program carrier for execution by, or to control the operation of, data processing apparatus. Further still, program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

According to embodiments of the present disclosure the term "data processing apparatus" can encompass all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A system for controlling a movement of a plurality of elevator cars of an elevator system, comprising:
   at least one input interface for accepting a plurality of hall calls requesting service of the plurality of elevator cars to different floors of a building;
   a processor in communication with the at least one input interface is configured to
      determine, for each elevator car, an individual waiting time of accommodating each hall call assigned to the elevator car;
      determine, for each pair of the hall calls assigned to each elevator car, a pairwise delay over the individual waiting time of each hall call in the pair caused by a joint assignment of the elevator car to accommodate the pair of the hall calls;
      approximate a cumulative waiting time of an assignment of the plurality of elevator cars to accommodate the plurality of hall calls as a sum of individual waiting times for accommodating each hall call with the assigned elevator car, and a sum of all pairwise delays determined between all pairs of hall calls assigned to the same elevator car;
      determine the assignment of the plurality of elevator cars using a branch and bound algorithm using spectral relaxations based on a generalized eigenvalue and spectral branching that assigns the plurality of hall calls to the plurality of elevator cars to minimize the approximated cumulative waiting time; and
   a controller for controlling the movement of the plurality of elevator cars according to the assignment.

2. The system of claim 1, wherein the branch and bound algorithm uses the spectral relaxations based on the generalized eigenvalue and the spectral branching to identify a branching variable, such that the branching variable takes on a value of 1 when a passenger i is assigned to a car c, or the branching variable takes on a value of 0.

3. The system of claim 1, wherein the branch and bound algorithm includes a parameter $\lambda_g$ that is kept fixed for all nodes in a search tree.

4. The system of claim 1, wherein the branch and bound algorithm uses the spectral relaxations, such that spectral relaxations include a relaxation parameter that is changed at every node in a search tree.

5. The system of claim 1, wherein the branch and bound algorithm uses the spectral relaxations based on the generalized eigenvalue and the spectral branching to identify a branching variable, such that the branching variable is chosen based on the branching variable that is closest to half.

6. The system of claim 1, wherein the generalized eigenvalue is computed using a sufficiently large value of a multiplicative factor for equality constraints, such that the multiplicative factor for the equality constraints is a scalar constant $\delta$, that is greater than or equal to 1.

7. The system of claim 1, wherein the generalized eigenvalue is computed using a value of 1 for a multiplicative factor for equality constraints.

8. A method for scheduling elevator cars of an elevator system, comprising:
   using at least one input interface for accepting a plurality of hall calls requesting the plurality of elevator cars to different floors of a building;
   determining independently, using a processor in communication with the at least one input interface, for each elevator car, an individual waiting time of accommodating each hall call assigned to the elevator car;
   determining, for each pair of the hall calls assigned for each elevator car, a pairwise delay over the individual waiting time of each hall call in the pair caused by a joint assignment of the elevator car to accommodate the pair of the hall calls;
   approximating a cumulative waiting time of an assignment of the plurality of elevator cars to accommodate the plurality of hall calls as a sum of individual waiting times for accommodating each hall call with the assigned elevator car and a sum of all pairwise delays (SPD) determined for the assigned elevator car between all pairs of hall calls assigned to the same elevator car;
   determining the assignment of the plurality of elevator cars using a branch and bound algorithm using quadratic cutting surface algorithm and spectral branching that assigns the plurality of hall calls to the plurality of elevator cars to minimize the approximated cumulative waiting time; and
   using a controller for controlling the movement of the plurality of elevator cars according to the assignment.

9. The method of claim 8, wherein the use of the SPD converts an optimization approach from a Semi-Assignment Problem to a Quadratic Semi-Assignment Problem (QSAP), such that the QSAP is optimized by reformulating the QSAP as a general mixed integer quadratic programming problem (MIQP), wherein solving for the MIQP using the branch and bound algorithm includes employing a relaxation in order to yield an optimum lower bound.

10. The method of claim 9, wherein the quadratic cutting surface algorithm (QCSA) is used to obtain lower bounds on the MIQP, and the QCSA is also used in conjunction with the branch-and-bound algorithm to obtain an algorithm to solve the MIQP, such that the lower bounds obtained by the QCSA on the MIQP is a level of improvement that is above a level of improvement of lower bounds obtained using spectral relaxations on the MIQP.

11. A method for scheduling elevator cars of an elevator system, comprising:
   using at least one input interface for accepting a plurality of hall calls requesting the plurality of elevator cars to different floors of a building;
   determining independently, using a processor in communication with the at least one input interface, for each elevator car, an individual waiting time of accommodating each hall call assigned to the elevator car;
   determining, for each pair of the hall calls assigned for each elevator car, a pairwise delay over the individual waiting time of each hall call in the pair caused by a joint assignment of the elevator car to accommodate the pair of the hall calls;

approximating a cumulative waiting time of an assignment of the plurality of elevator cars to accommodate the plurality of hall calls as a sum of individual waiting times for accommodating each hall call with the assigned elevator car and a sum of all pairwise delays determined for the assigned elevator car between all pairs of hall calls assigned to the same elevator car;

determining the assignment of the plurality of elevator cars using a branch and bound algorithm using spectral relaxations based on a generalized eigenvalue and spectral branching that assigns the plurality of hall calls to the plurality of elevator cars to minimize the approximated cumulative waiting time; and using a controller for controlling the movement of the plurality of elevator cars according to the assignment.

12. The method of claim 11, wherein the branch and bound algorithm includes a parameter $\lambda_g$ that is kept fixed for all nodes in a search tree.

13. The method of claim 11, wherein the branch and bound algorithm uses the spectral relaxations, such that spectral relaxations include a relaxation parameter that is changed at every node in a search tree.

14. The method of claim 11, wherein the branch and bound algorithm uses the spectral relaxations based on the generalized eigenvalue and the spectral branching to identify a branching variable, such that the branching variable is chosen based on the branching variable that is closest to half.

15. The method of claim 11, wherein the generalized eigenvalue is computed using a sufficiently large value of a multiplicative factor for equality constraints, such that the multiplicative factor for the equality constraints is a scalar constant $\delta$, that is greater than or equal to 1.

16. The method of claim 11, wherein the branch and bound algorithm uses the spectral relaxations based on the generalized eigenvalue and the spectral branching to identify a branching variable, such that the branching variable takes on a value of 1 when a passenger i is assigned to a car c, or the branching variable takes on a value of 0.

17. A non-transitory computer readable storage medium embodied thereon a program executable by a computer for performing a method, the method for scheduling elevator cars of an elevator system, the elevator system including a plurality of elevator cars, and a plurality of hall calls, comprising:

using at least one input interface for accepting a plurality of hall calls requesting the plurality of elevator cars to different floors of a building;

determining independently, using a process in communication with the at least one input interface, for each elevator car, an individual waiting time of accommodating each hall call assigned to the elevator car;

determining, for each pair of the hall calls assigned for each elevator car, a pairwise delay over the individual waiting time of each hall call in the pair caused by a joint assignment of the elevator car to accommodate the pair of the hall calls;

approximating a cumulative waiting time of an assignment of the plurality of elevator cars to accommodate the plurality of hall calls as a sum of individual waiting times for accommodating each hall call with the assigned elevator car and a sum of all pairwise delays determined for the assigned elevator car between all pairs of hall calls assigned to the same elevator car;

determining the assignment of the plurality of elevator cars using a branch and bound algorithm using spectral relaxations based on a generalized eigenvalue and spectral branching that assigns the plurality of hall calls to the plurality of elevator cars to minimize the approximated cumulative waiting time; and using a controller for controlling the movement of the plurality of elevator cars according to the assignment.

18. The non-transitory computer readable storage medium method of claim 17, wherein the branch and bound algorithm uses the spectral relaxations, such that spectral relaxations include a relaxation parameter that is changed at every node in a search tree.

19. The non-transitory computer readable storage medium method of claim 17, wherein the branch and bound algorithm uses the spectral relaxations, such that spectral relaxations include a relaxation parameter that is changed at every node in a search tree, and that the branch and bound algorithm includes a parameter $\lambda_g$ that is kept fixed for all nodes in a search tree.

20. The non-transitory computer readable storage medium method of claim 17, wherein the branch and bound algorithm uses the spectral relaxations based on the generalized eigenvalue and the spectral branching to identify a branching variable, such that the branching variable takes on a value of 1 when a passenger i is assigned to a car c, or the branching variable takes on a value of 0.

\* \* \* \* \*